US012489917B2

(12) United States Patent
Ma et al.

(10) Patent No.: US 12,489,917 B2
(45) Date of Patent: Dec. 2, 2025

(54) INTER PREDICTION METHOD, ENCODER, DECODER, AND STORAGE MEDIUM

(71) Applicant: GUANGDONG OPPO MOBILE TELECOMMUNICATIONS CORP., LTD., Guangdong (CN)

(72) Inventors: Yanzhuo Ma, Dongguan (CN); Junyan Huo, Dongguan (CN); Shuai Wan, Dongguan (CN); Fuzheng Yang, Dongguan (CN); Qihong Ran, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 103 days.

(21) Appl. No.: 17/955,264

(22) Filed: Sep. 28, 2022

(65) Prior Publication Data
US 2023/0045687 A1   Feb. 9, 2023

Related U.S. Application Data

(63) Continuation of application No. PCT/CN2020/083313, filed on Apr. 3, 2020.

(51) Int. Cl.
*H04N 19/52* (2014.01)
*H04N 19/105* (2014.01)
(Continued)

(52) U.S. Cl.
CPC .......... *H04N 19/52* (2014.11); *H04N 19/105* (2014.11); *H04N 19/109* (2014.11);
(Continued)

(58) Field of Classification Search
None
See application file for complete search history.

(56) References Cited

U.S. PATENT DOCUMENTS 9,807,424 B2    10/2017  Guo et al.
2021/0360274 A1*  11/2021  Hsiao ............... H04N 19/176
(Continued)

FOREIGN PATENT DOCUMENTS

CN    102870414 A    1/2013
CN    109819255 A    5/2019
(Continued)

OTHER PUBLICATIONS

International Search Report Mailed Dec. 30, 2022 in Application No. PCT/CN2020/083313.
(Continued)

*Primary Examiner* — Lindsay J Uhl
(74) *Attorney, Agent, or Firm* — PERKINS COIE LLP

(57) ABSTRACT

Embodiments of the present application provide an inter prediction method, an encoder, a decoder, and a storage medium. The method comprises: determining a prediction mode parameter of a current block; when the prediction mode parameter indicates that the current block determines an inter prediction value by using a geometrical partition mode (GPM), constructing a merge candidate list of the current block; constructing a GPM motion information candidate list according to first motion information in the merge candidate list of the current block; and determining an inter prediction value of the current block according to the GPM motion information candidate list.

12 Claims, 10 Drawing Sheets

Merge list

(51) Int. Cl.
   *H04N 19/109*  (2014.01)
   *H04N 19/119*  (2014.01)
   *H04N 19/139*  (2014.01)
   *H04N 19/159*  (2014.01)
   *H04N 19/167*  (2014.01)
   *H04N 19/176*  (2014.01)
   *H04N 19/56*   (2014.01)
   *H04N 19/70*   (2014.01)

(52) U.S. Cl.
   CPC ......... *H04N 19/119* (2014.11); *H04N 19/139* (2014.11); *H04N 19/159* (2014.11); *H04N 19/167* (2014.11); *H04N 19/176* (2014.11); *H04N 19/56* (2014.11); *H04N 19/70* (2014.11)

(56) References Cited

U.S. PATENT DOCUMENTS

2022/0014780 A1\* 1/2022 Wang ................... H04N 19/176
2022/0224897 A1\* 7/2022 Zhang .................. H04N 19/105

FOREIGN PATENT DOCUMENTS

CN      110868613 A    3/2020
TW      202002630 A    1/2020

OTHER PUBLICATIONS

Written Opinion Mailed Dec. 30, 2020 in Application No. PCT/CN2020/083313, 8 pages.

Zhang et al., CE10-related: Merge list construction process for triangular prediction mode, Joint Video Experts Team (JVET), of ITU-T SG 16 WP 3 and ISO/IEC JTC 1/SC 29/WG 11, 13th Meeting: Marrakech, MA, Jan. 9-18, 2019, Document: JVET-M0271, 4 pages.

Zhang et al., CE4-4.4: Merge list construction for triangular prediction mode, Joint Video Experts Team (JVET) of ITU-T SG 16 WP 3 and ISO/IEC JTC 1/SC 29/WG 11, 14th Meeting: Geneva, CH, Mar. 19-27, 2019, Document: JVET-N0269, 3 pages.

Wang et al., CE4-related: An improved method for triangle merge list construction, Joint Video Experts Team (JVET), of ITU-T SG 16 WP 3 and ISO/IEC JTC 1/SC 29/WG 11, 14th Meeting: Geneva, CH, Mar. 19-27, 2019, Document: JVET-N0340, 4 pages.

Esenlik et al., Non-CE4: Geometrical partitioning for inter blocks, Joint Video Experts Team (JVET) of ITU-T SG 16 WP 3 and ISO/IEC JTC 1/SC 29/WG 11, 15th Meeting: Gothenburg, SE, Jul. 3-12, 2019, Document: JVET-O0489-v4, 9 pages.

MediaTek Inc. "CE10-related: Simplification of triangle merging candidate list derivation" JVET-M0184-v1; JVET of ITU-T SG 16 WP 3 and ISO/IEC JTC 1/SC 29/WG 11; 13th meeting; Marrakech, MA; Jan. 9-18, 2019. 3 pages.

Extended European Search Report for European Application No. 20928595.6 issued Mar. 16, 2023. 7 pages.

First office action of Taiwanese application No. 110109409 issued on May 7, 2024, 10 pages with English translation.

Examination report of European application No. 20928595.6 issued on Feb. 19, 2025, 5 pages.

\* cited by examiner

A. Luma weight matrix of current block

FIG. 16A

B. Chroma weight matrix of current block

FIG. 16B

INTER PREDICTION METHOD, ENCODER, DECODER, AND STORAGE MEDIUM

CROSS-REFERENCE TO RELATED APPLICATION

The present application is a continuation application of International PCT Application No. PCT/CN2020/083313, filed on Apr. 3, 2020, the entire content of which is hereby incorporated by reference.

TECHNICAL FIELD

Embodiments of the present application relate to video image processing technology, and relate to, but are not limited to, a method for inter predication, an encoder, a decoder, and a storage medium.

BACKGROUND

In the aspect of video encoding and decoding, in addition to intra prediction, inter prediction may also be used in a process of encoding and decoding of a current block. Inter prediction may include motion estimation and motion compensation. For the motion compensation, in a process of formulating Versatile Video Coding (VVC), partitions of other shapes other than square and rectangle are introduced. First Triangular partition Mode (TPM) is introduced, in which a diagonal or back-diagonal of a square or rectangle is used as a partitioning line to obtain a triangular prediction unit, thereby representing inter prediction data more flexibly and reducing prediction errors, thus improving encoding efficiency.

At a Joint Video Experts Team (JVET) meeting, a Geometrical partition Mode (GPM), which is more flexible than the TPM, is introduced. A Merge list of the GPM follows the construction mode of the Merge list of TPM before VVC Test Model (VTM) version 8.0, and the existing conventional Merge list is reused. However, as motion characteristics of different areas are different and two partitions of GPM are constructed only using unidirectional prediction, in the current design, a one-odd and one-even mode is selected to select only motion vectors in one direction are selected in items of each merge list to construct a GPM motion information candidate list. Although there are duplicate checking and duplicate removal operations in the construction process of a Merge list, there is still a high probability that duplicate items appear in the constructed motion information candidate list, which seriously affects the expression efficiency of motion information, thereby reducing the efficiency of video encoding and decoding.

SUMMARY

The embodiments of the present application provide a method for inter prediction, an encoder, a decoder and a storage medium, which can improve the expression efficiency of motion information and improve the efficiency of video encoding and decoding.

In a first aspect, an embodiment of the present application provides a method for inter prediction, applied to an encoder. The method includes: determining a prediction mode parameter of a current block; constructing a merge candidate list of the current block when the prediction mode parameter indicates that the current block determines an inter prediction value by using a geometrical partition mode (GPM); constructing a GPM motion information candidate list according to first motion information in the merge candidate list of the current block, wherein a process of the constructing includes performing duplicate information removal processing on the first motion information; and determining an inter prediction value of the current block according to the GPM motion information candidate list.

In a second aspect, an embodiment of the present application provides a method for inter prediction applied to a decoder. The method includes: parsing a bitstream to determine a prediction mode parameter of a current block; constructing a merge candidate list of the current block when the prediction mode parameter indicates that the current block determines an inter prediction value by using a geometrical partition mode (GPM); constructing a GPM motion information candidate list according to first motion information in the merge candidate list of the current block, wherein a process of the constructing includes performing duplicate information removal processing on the first motion information; and determining an inter prediction value of the current block according to the GPM motion information candidate list.

In a third aspect, an embodiment of the present application provides an encoder, including: a determining unit configured to determine a prediction mode parameter of a current block; a first constructing unit configured to construct a merge candidate list of the current block when the prediction mode parameter indicates that the current block determines an inter prediction value by using a geometrical partition mode (GPM); a first processing unit configured to construct a GPM motion information candidate list according to first motion information in the merge candidate list of the current block, wherein a process of the constructing includes performing duplicate information removal processing on the first motion information; and a first predicting unit configured to determine an inter prediction value of the current block according to the GPM motion information candidate list.

In a fourth aspect, an embodiment of the present application provides a decoder, including: a parsing unit configured to parse a bitstream to determine a prediction mode parameter of a current block; a second constructing unit configured to construct a merge candidate list of the current block when the prediction mode parameter indicates that the current block determines an inter prediction value by using a geometrical partition mode (GPM), a second processing unit configured to construct a GPM motion information candidate list according to first motion information in the merge candidate list of the current block, wherein a process of the constructing includes performing duplicate information removal processing on the first motion information; and a second predicting unit configured to determine an inter prediction value of the current block according to the GPM motion information candidate list.

In a fifth aspect, an embodiment of the present application further provides an encoder, including: a first memory and a first processor; the first memory stores a computer program runnable on the first processor, and when the first processor executes the program, the method for inter prediction of the encoder is implemented.

In a sixth aspect, an embodiment of the present application provides a decoder, including: a second memory and a second processor; the second memory stores a computer program runnable on the second processor, and when the second processor executes the program, the method for inter prediction of the decoder is implemented.

In a seventh aspect, an embodiment of the present application provides a storage medium on which a computer program is stored, when the computer program is executed by a first processor, the method for inter prediction of an encoder is implemented; or when the computer program is executed by a second processor, the method for inter prediction of a decoder is implemented.

The embodiments of the present application provide a method for inter prediction, an encoder, a decoder and a storage medium. The method includes: determining a prediction mode parameter of a current block; constructing a merge candidate list of the current block when the prediction mode parameter indicates that the current block determines an inter prediction value by using a geometrical partition mode (GPM); constructing a GPM motion information candidate list according to first motion information in the merge candidate list of the current block; and determining an inter prediction value of the current block according to the GPM motion information candidate list. In this way, when a GPM motion information candidate list is constructed by using a merge candidate list, first, duplicate checking and duplicate removal processing are performed on the merge candidate list, and then a motion information candidate list is constructed, so that duplicate motion information in the GPM motion information candidate list can be avoided, the length of the GPM motion information candidate list is reduced, and the expression efficiency of motion information is increased, and thus the efficiency of video encoding and decoding is improved.

BRIEF DESCRIPTION OF DRAWINGS

FIG. 16A is a schematic diagram of exemplary weight values of luma according to an embodiment of the present application.

FIG. 16B is a schematic diagram of exemplary weight values of chroma according to an embodiment of the present application.

DETAILED DESCRIPTION

In order to understand features and technical contents of embodiments of the present application in more detail, implementations of the embodiments of the present application will be described in detail below in combination with the accompanying drawings, which are for reference only and are not intended to limit the embodiments of the present application.

Figure 1:
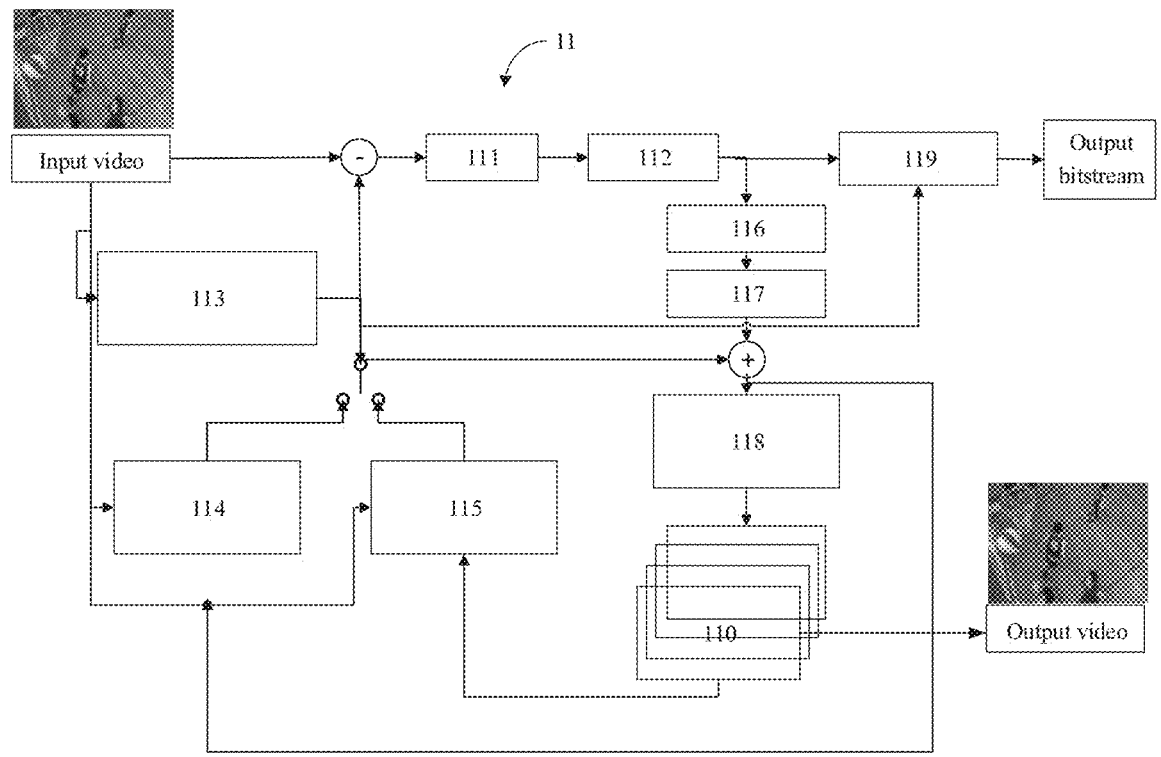
FIG. 1 is a schematic block diagram of a structure of a video encoding system according to an embodiment of the present application.

The present application provides a video encoding system. As shown in FIG. 1, the video encoding system 11 includes: a transform unit 111, a quantization unit 112, a mode selection and encoding control logic unit 113, an intra prediction unit 114, an inter prediction unit 115 (including motion compensation and motion estimation), an inverse quantization unit 116, an inverse transform unit 117, a loop filter unit 118, an encoding unit 119 and a decoded image buffer unit 110. For an input original video signal, a video reconstruction block may be obtained by partitioning a Coding Tree Unit (CTU), and an encoding mode is determined by the mode selection and encoding control logic unit 113. Then, for residual pixel information obtained after intra or inter prediction, the video reconstruction block is transformed (including the residual information being transformed from a pixel domain to a transform domain) and the obtained transform coefficients are quantized by the transform unit 111 and the quantization unit 112, to further reduce a bit rate. The intra prediction unit 114 is used for intra prediction of the video reconstruction block. The intra prediction unit 114 is configured to determine an optimal intra prediction mode (i.e., a target prediction mode) of the video reconstruction block. The inter prediction unit 115 is configured to perform inter prediction encoding of the received video reconstruction block relative to one or more blocks in one or more reference frames to provide time prediction information. The motion estimation is a process of generating a motion vector which may be used to estimate motion of the video reconstruction block, and then the motion compensation is performed based on a motion vector determined by the motion estimation. After determining an inter prediction mode, the inter prediction unit 115 is further configured to provide the selected inter prediction data to the encoding unit 119, and send the calculated motion vector data to the encoding unit 119 as well. In addition, the inverse quantization unit 116 and the inverse transform unit 117 are configured to reconstruct the video reconstruction block and reconstruct residual blocks in the pixel domain. Blocking artifact of the reconstructed residual block is removed by the loop filter unit 118, and then the reconstructed residual block is added into a predictive block in a frame of the decoded image buffer unit 110 to generate a reconstructed video reconstruction block. The encoding unit 119 is configured to encode various encoding parameters and quantized transform coefficients. The decoded image buffer unit 110 is configured to store the reconstructed video reconstruction block for prediction reference. With the progress of video image encoding, new reconstructed video reconstruction blocks will be generated continuously, and will all be stored in the decoded image buffer unit 110.

Figure 2:
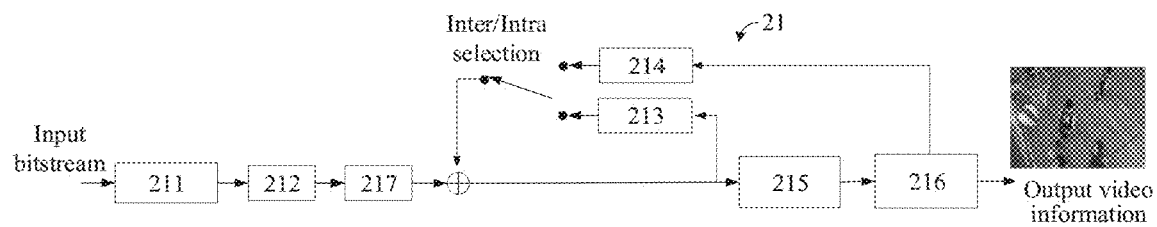
FIG. 2 is a schematic block diagram of a structure of a video decoding system according to an embodiment of the present application.

An embodiment of the present application provides a video decoding system. FIG. 2 is a schematic diagram of a structure of a structure of a video decoding system according to an embodiment of the present application. As shown in FIG. 2, the video decoding system 21 includes; a decoding unit 211, an inverse transform unit 217, an inverse quantization unit 212, an intra prediction unit 213, a motion compensation unit 214, a loop filter unit 215 and a decoded image buffer unit 216. After an input video signal is encoded by the video encoding system 11, a bitstream of the video signal is output. The bitstream is input into the video decoding system 21, and it first passes the decoding unit 211 to obtain a transform coefficient after decoding. The transform coefficient is processed through the inverse transform unit 217 and the inverse quantization unit 212 to generate a residual block in the pixel domain. The intra prediction unit 213 may be configured to generate prediction data of the current video decoding block based on the determined intra prediction direction and data from a previous decoding block of the current frame or picture. The motion compensation unit 214 determines prediction information for the video decoding block by analyzing a motion vector and other related syntax element(s), and uses the prediction information to generate a predictive block of the video decoding block being decoded. A decoded video block is formed by summing the residual block from the inverse transform unit 217 and the inverse quantization unit 212 with a corresponding predictive block generated by the intra prediction unit 213 or the motion compensation unit 214. The decoded video signal passes the loop filter unit 215 to remove blocking artifacts, which may improve video quality. Then, the decoded video block is stored in the decoded image buffer unit 216. The decoded image buffer unit 216 stores a reference image for subsequent intra prediction or motion compensation, and is also used for outputting of a video signal to obtain a restored original video signal.

A method for inter prediction according to an embodiment of the present application is mainly applied to the inter prediction unit 115 of the video encoding system 11 and the inter prediction unit, i.e., the motion compensation unit 214, of the video decoding system 21. That is to say, if a relatively good prediction effect can be obtained in the video encoding system 11 using the method for inter prediction according to an embodiment of the present application, then accordingly, the video decoding restoration quality can be improved at a decoder end as well.

Based on this, the technical solutions of the present application will be further set forth in detail in conjunction with the drawings and embodiments. Before the elaborating, it should be noted that "first", "second", "third", etc. mentioned throughout the specification are only for the purpose of distinguishing different features, and are not intended to limit priority, sequence or size relationship, or the like.

An embodiment of the present application provides a method for inter prediction. The method is applied to a video encoding device, i.e., an encoder. Functions implemented by the method may be implemented through invoking program codes by a processor in the video encoding device. Of course, the program codes may be stored in a computer storage medium. It is thus seen that the video encoding device at least includes a processor and a storage medium.

Figure 3:
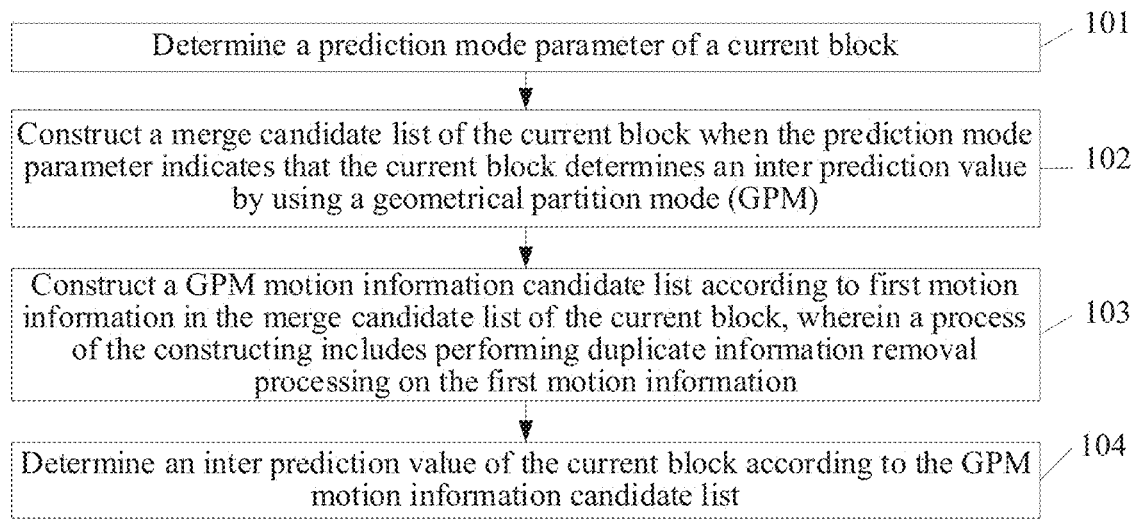
FIG. 3 is a first schematic flowchart of a method for inter prediction according to an embodiment of the present application.

FIG. 3 is a first schematic flowchart of a method for intra prediction according to an embodiment of the present application. The method is applied to an encoder. As shown in FIG. 3, the method includes acts 101 to 104.

In act 101, a prediction mode parameter of a current block is determined.

It should be noted that the prediction mode parameter indicates an encoding mode of the current block and a parameter related to the mode. Generally, the prediction mode parameter of the current block may be determined by means of Rate Distortion Optimization (RDO).

Specifically, in some embodiments, an implementation of determining a prediction mode parameter of a current block by an encoder is that: determining, by the encoder, an image component to be predicted of the current block; predicting and encoding the image component to be predicted using a plurality of prediction modes respectively based on a parameter of the current block, and calculating a rate distortion cost result corresponding to each of the plurality of prediction modes; and selecting a minimum rate distortion cost result from a plurality of calculated rate distortion cost results, and determining a prediction mode corresponding to the minimum rate distortion cost result as the prediction mode parameter of the current block.

That is to say, at the encoder side, for the current block, a plurality of prediction modes may be adopted to encode the image component to be predicted respectively. Here, the plurality of prediction modes usually include an inter prediction mode, a traditional intra prediction mode and a non-traditional intra prediction mode. The traditional intra prediction mode may include a Direct Current (DC) mode, a PLANAR mode, an angular mode, etc. The non-traditional intra prediction mode may include an MIP mode, a Cross-component Linear Model Prediction (CCLM) mode, an Intra Block Copy (IBC) mode, a Palette (PLT) mode, etc. The inter prediction mode may include: a Geometrical partition Mode (GPM), a Triangle partition mode (TPM), etc.

In this way, after the current block is encoded by using the plurality of prediction modes respectively, the rate distortion cost result corresponding to each prediction mode may be obtained; and then the minimum rate distortion cost result is selected from the plurality of obtained rate distortion cost results, and the prediction mode corresponding to the minimum rate distortion cost result is determined as the prediction mode parameter of the current block. Thus finally the current block may be encoded by using the determined prediction mode, and in this prediction mode a prediction residual can be small, and the encoding efficiency can be improved.

In act 102, a merge candidate list of the current block is constructed when the prediction mode parameter indicates that the current block determines an inter prediction value by using a geometrical partition mode (GPM).

In an embodiment of the present application, when the prediction mode parameter indicates that GPM is used to determine the inter prediction of the current block, a merge candidate list of the current block is constructed. The merge candidate list contains a plurality of candidate motion vectors (MVs) for motion prediction of the current block, the MV is a two-dimensional vector for inter prediction, and provides an offset from coordinates in a decoding picture to coordinates in a reference picture.

Inter prediction is to generate a prediction value of the current block by indicating, through the mv, a position of a pixel for prediction in a reference frame, according to pixels in the reference frame of the current block. The reference frame serves as a picture or frame of a short-term reference picture or a long-term reference picture, and contains samples for inter prediction that may be used for the decoding process of subsequent pictures in a decoding order.

A coding unit (CU), corresponding to a rectangular area of A×B in an image, includes A×B luma pixels or/and corresponding chroma pixels. A is a width of the rectangle and B is a height of the rectangle. A and B may be the same or different, and the values of A and B are generally an integer power of 2, for example, 128, 64, 32, 16, 8, 4. An encoding unit includes a prediction image and a residual image, and a reconstruction image of the encoding unit is obtained by summing the prediction image and the residual image. The prediction image is generated by intra prediction or inter prediction, and the residual image is generated by inverse quantization and inverse transform processing of transform coefficients.

Merging is an inter encoding approach in which motion vectors are not transmitted directly in a bitstream. The current block may select corresponding motion information from a merge candidate list according to a merge index, and take merge candidate motion information as the motion information of the current block, or scale the merge candidate motion information and then take the scaled merge candidate motion information as the motion information of the current block. The current block determines an inter prediction value according to the motion information.

Usually, images of a video sequence are partitioned into image blocks for encoding. In a video encoding hybrid framework, encoding techniques such as prediction, transformation and quantization are usually implemented only in a unit of a square or rectangular block. However, in practice, edges of moving objects are not necessarily horizontal or vertical. Even if they are, they are not necessarily just on edges of blocks that can be partitioned. And motion vectors on two sides of a motion edge are often different, thus relatively large prediction errors will easily occur when a whole block is used for motion prediction and compensation in the encoding process, leading to limited encoding efficiency.

Figure 4A:
FIGS. 4A-4B are two schematic diagrams of partitioning of TPM mode.
Figure 4B:
Figure 5A:
FIGS. 5A-5G are seven schematic diagrams of partitioning of GPM mode.
Figure 5B:
Figure 5C:
Figure 5D:
Figure 5E:
Figure 5F:
Figure 5G:

In a process of formulating VVC, a triangular prediction unit is introduced by TPM, wherein the triangular prediction unit is obtained by using a diagonal or back-diagonal of a square or rectangle as a partitioning line, as shown in FIGS. 4A-4B, thereby inter prediction data are represented more flexibly, and prediction errors are reduced, thus encoding efficiency is improved.

In the 15th meeting of VET, a Geometrical partitioning for inter blocks (GEO), which is more flexible than TPM, was proposed. After discussions in two meetings, JVET formally adopted GEO prediction mode into VVC standard and changed its name as Geometrical partition Mode (GPM). This technique adopts a more flexible representation approach for edge portions of a moving object in an image, and partitions an inter block into two non-rectangular sub-partitions, predicts the two non-rectangular sub-partitions respectively and then weight and merge them, as shown in FIGS. 5A-5G.

There are totally 64 partitioning modes in the GPM technique in the current VVC Draft 8. Each partitioning mode corresponds to an angle $\alpha$ and a step size $\rho$, and there are totally 20 angles and 4 step sizes.

Figure 6:
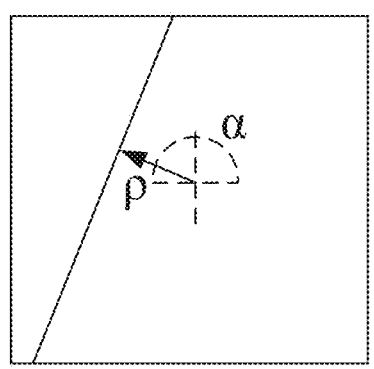
FIG. 6 is an exemplary schematic diagram of an angle and a step size of a current block according to an embodiment of the present application.

As an example, as shown in FIG. 6, each of combinations of angles and step sizes constitutes a partitioning mode. The current block is partitioned into two non-rectangular sub-partitions in GPM, and unidirectional motion compensation is performed on each sub-partition respectively to obtain a unidirectional prediction value. The unidirectional prediction values of the two partitions are finally weighted and merged using a weight matrix to obtain the final GPM prediction value.

In an embodiment of the present application, at an encoder side, when it is determined that inter prediction is performed using GPM, the encoder may acquire a GPM parameter of the current block when GPM is used by the current block for inter prediction. The encoder determines a partitioning mode with the minimum rate distortion cost by traversing the 64 partitioning modes corresponding to the GPM, i.e., determines a target partitioning mode. The encoder may then determine angle index information and step size index information corresponding to the target partitioning mode according to the target partitioning mode by presetting a mapping table of partitioning modes, angle indexes and step size indexes. When the current prediction block uses the GPM mode, corresponding angle angleIdx and step size distanceIdx will be obtained by looking up the table according to a partitioning mode index merge_gpm_partition_idx selected by the current block. The mapping table of partitioning modes is as shown in Table 1:

TABLE 1

| merge_gpm_partition_idx | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| angleIdx | 0 | 0 | 2 | 2 | 2 | 2 | 3 | 3 | 3 | 3 | 4 | 4 | 4 | 4 | 5 | 5 |
| distanceIdx | 1 | 3 | 0 | 1 | 2 | 3 | 0 | 1 | 2 | 3 | 0 | 1 | 2 | 3 | 0 | 1 |
| merge_gpm_partition_idx | 16 | 17 | 18 | 19 | 20 | 21 | 22 | 23 | 24 | 25 | 26 | 27 | 28 | 29 | 30 | 31 |
| angleIdx | 5 | 5 | 8 | 8 | 11 | 11 | 11 | 11 | 12 | 12 | 12 | 12 | 13 | 13 | 13 | 13 |
| distanceIdx | 2 | 3 | 1 | 3 | 0 | 1 | 2 | 3 | 0 | 1 | 2 | 3 | 0 | 1 | 2 | 3 |
| merge_gpm_partition_idx | 32 | 33 | 34 | 35 | 36 | 37 | 38 | 39 | 40 | 41 | 42 | 43 | 44 | 45 | 46 | 47 |
| angleIdx | 14 | 14 | 14 | 14 | 16 | 16 | 18 | 18 | 18 | 19 | 19 | 19 | 20 | 20 | 20 | 21 |
| distanceIdx | 0 | 1 | 2 | 3 | 1 | 3 | 1 | 2 | 3 | 1 | 2 | 3 | 1 | 2 | 3 | 1 |

TABLE 1-continued

| merge_gpm_partition_idx | 48 | 49 | 50 | 51 | 52 | 53 | 54 | 55 | 56 | 57 | 58 | 59 | 60 | 61 | 62 | 63 |
|---|---|---|---|---|---|---|---|---|---|---|---|---|---|---|---|---|
| angleIdx | 21 | 21 | 24 | 24 | 27 | 27 | 27 | 28 | 28 | 28 | 29 | 29 | 29 | 30 | 30 | 30 |
| distanceIdx | 2 | 3 | 1 | 3 | 1 | 2 | 3 | 1 | 2 | 3 | 1 | 2 | 3 | 1 | 2 | 3 |

Here, wedge_partition_idx is a partitioning mode index, angleIdx is angle index information, and distanceIdx is step size index information.

Figure 7:
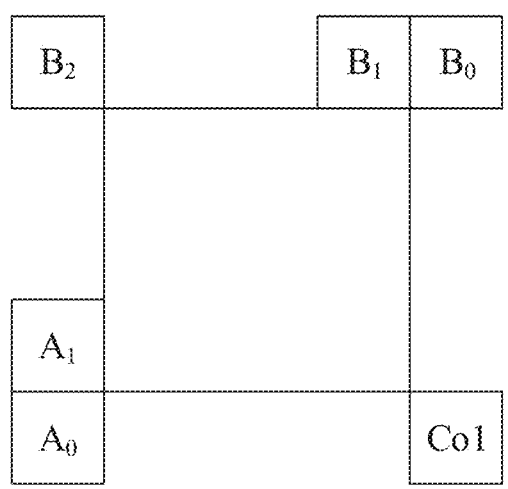
FIG. 7 is a schematic diagram of positions of adjacent blocks of a spatial Merge candidate list in an embodiment of the present application.

Specifically, a process of constructing a merge candidate list of the current block is the same as a process of constructing a list in an ordinary merge mode. FIG. 7 is a schematic diagram of positions of adjacent blocks of a spatial Merge candidate list in an embodiment of the present application. As shown in FIG. 7, a construction order of adjacent blocks in the Merge candidate list is as follows: left adjacent block A1, upper adjacent block B1, upper right adjacent block B0, lower left adjacent block A0, upper left adjacent block B2; and motion vector information of block col in the position corresponding to the reference frame is motion vector information of the adjacent blocks arranged sequentially, which distinguishes different directional sources.

Unidirectional or bidirectional mv information of the five adjacent blocks in FIG. 7 is acquired, and unidirectional or bidirectional mv information of each adjacent block is added to the merge candidate list according to the adjacent block adding order (A1-B1-B-A0 (B2)) to constitute candidate items of the current block, wherein B2 is a substitute, and when at least one of the previous four items is unavailable, the mv information of B2 needs to be added to the candidate list. The adjacent block adding order represents magnitudes of correlations of the respective mv information with the mv information of the current block, i.e., the adding order of the merge candidate list represents magnitudes of likelihoods that candidate items are selected as the mv information of the current block, and also represents magnitudes of accuracies after the candidate items are selected as the mv information of the current block.

Figure 8:
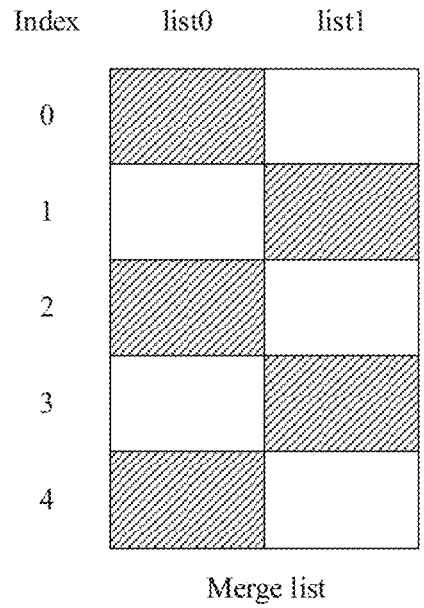
FIG. 8 is a first structure diagram of a merge list in an embodiment of the present application.

FIG. 8 is a first structure diagram of a merge list in an embodiment of the present application. The merge candidate list in FIG. 8 is obtained according to the schematic diagram of positions of the adjacent blocks of FIG. 7. As shown in FIG. 8, the merge candidate list includes mv information of five adjacent blocks, with the indexes 0, 1, 2, 3 and 4 respectively, and each adjacent block contains bidirectional prediction mv information, i.e., list0 and list1. Since in the GPM prediction mode, each partition will only use a unidirectional prediction mode, but each item in the merge list may be bidirectional prediction mv information, it is needed to take out unidirectional prediction mv for usage. Let X=(m & 0x01), where X is reference list indication information, which is used for indicating list0 and list1, and & is a bitwise AND operation, i.e., taking out the last bit of m (similar to parity check). Accordingly, mv information predFlagLXM corresponding to a reference frame in a reference list corresponding to X is preferentially used for partition prediction, e.g., items corresponding to the shadow areas in FIG. 8. Only when the corresponding mv is not available (the mv of the adjacent block may itself be unidirectional), mv in the opposite position (the mv represented in the blank area horizontally corresponding to the shadow area) is used, i.e., X=1−X.

In act 103, a GPM motion information candidate list is constructed according to first motion information in the merge candidate list of the current block, wherein a process of the constructing includes performing duplicate information removal processing on the first motion information.

In practical applications, the purpose of performing duplicate checking and duplicate removal processing on the first motion information in the merge candidate list of the current block is to avoid duplicate motion information in the mv candidate list when a GPM motion information candidate list (also called "mv candidate list") is constructed, reduce a length of the mv candidate list, improve the expression efficiency of motion information, and thereby improve the efficiencies of video encoding and decoding.

Figure 9:
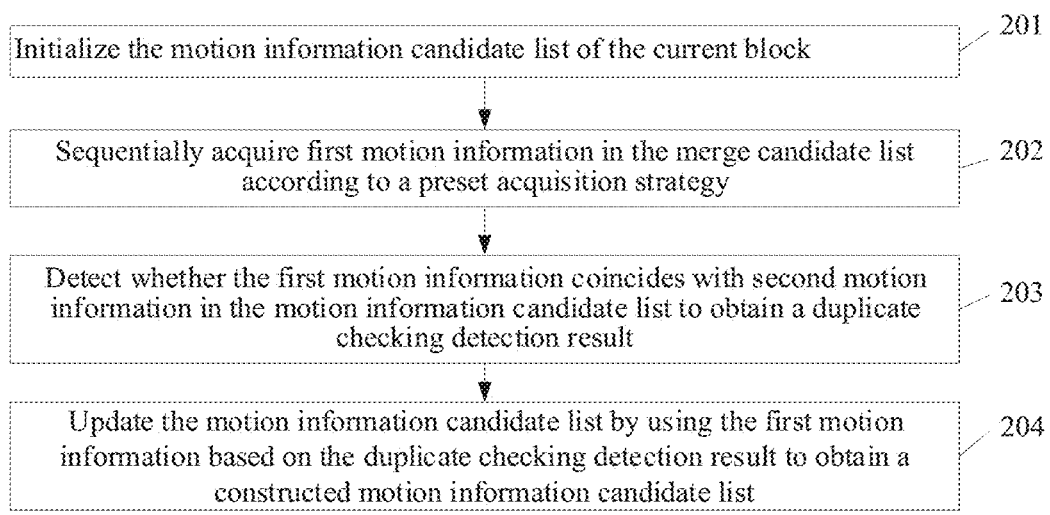
FIG. 9 is a schematic flowchart of a method for duplicate removal processing in an embodiment of the present application.

FIG. 9 is a schematic flowchart of a method for duplicate removal processing in an embodiment of the present application. As shown in FIG. 9, the duplicate removal processing act of act 103 in the method for inter prediction provided in an embodiment of the present application may specifically include act 201 to act 204.

In act 201, the GPM motion information candidate list of the current block is initialized.

Here, initializing the mv candidate list may refer to creating an empty mv candidate list for GPM, performing duplicate checking and duplicate removal processing on the my information in the merge candidate list ("merge list" for short), and then adding it to the my candidate list of GPM to ensure that there is no duplicate mv information in the mv candidate list of GPM.

In act 202, first motion information in the merge candidate list is sequentially acquired according to a preset acquisition strategy.

Here, the acquisition strategy specifies a duplicate checking order for the first motion information (also called first mv information) in the merge list. Preceding first mv information in the merge list based on the duplicate checking order is taken out earlier for the processing of duplicate information removal. When the first mv information taken out already exists in the mv candidate list, the first mv information taken out is ignored without using it to update the mv candidate list; and when the first mv information taken out does not exist in the my candidate list, the first mv information taken out needs to be used to update the mv candidate list.

In some embodiments, the acquisition strategy is determined by the construction order of adjacent blocks in the merge candidate list and reference list indication information. The construction order of adjacent blocks may be the order shown in FIG. 7. The reference list indication information is used for indicating usage priorities of the mv information of the first reference list and the mv information of the second reference list.

Act 202 may specifically include: sequentially acquiring first motion information in the merge candidate list according to the construction order of adjacent blocks in the merge candidate list and the reference list indication information; wherein the reference list indication information is used for indicating preferentially used motion information of the first reference list or preferentially used motion information of the second reference list.

As shown in FIG. 8, the Merge candidate list includes mv information of five adjacent blocks, with the indexes 0, 1, 2, 3 and 4 respectively, the construction order of the adjacent blocks may be an ascending order of indexes, and each adjacent block contains bidirectional prediction mv information, i.e., mv information in the list0 reference list, and mv information in the list1 reference list. Since in the GPM prediction mode, each partition will only use a unidirectional prediction mode, but each item in the merge list may be bidirectional prediction mv information, it is needed to take out unidirectional prediction mv for use. Let X=(m & 0x01), where X is reference list indication information, which is used for indicating the usage priorities of list0 and list1, X=0 indicates that the mv information in list0 is preferentially used, X=1 indicates that the mv information in list1 is preferentially used, and & is a bitwise AND operation, i.e., taking out the last bit of m (similar to parity check). Accordingly, my information predFlagLXM corresponding to a reference frame in a reference list corresponding to X is preferentially used for partition prediction, e.g., items corresponding to the shadow areas in FIG. 8. Only when the corresponding mv is not available (the mv of the adjacent block may itself be unidirectional), mv in the opposite position (the mv represented in the blank areas horizontally corresponding to the shadow areas) is used. i.e., X=1−X.

The first mv information in the merge candidate list is sequentially acquired according to the construction order of adjacent blocks in the merge candidate list and the reference list indication information, i.e., the first mv information in list0 or list1 indicated by the reference list indication information in each item is selected from top to bottom, that is, the first my information in the shadow areas is preferentially used from top to bottom in FIG. 8, and duplicate checking and duplicate removal processing is performed on the first mv information taken out.

Specifically, the sequentially acquiring first motion information in the merge candidate list according to the construction order of adjacent blocks in the merge candidate list and the reference list indication information includes: determining a target position of the merge candidate list according to the construction order of the adjacent blocks in the merge candidate list and the reference list indication information; acquiring first motion information stored in the target position if the first motion information in the target position is available; and acquiring first motion information stored in an opposite position of the target position if the first motion information in the target position is not available.

Taking FIG. 8 as an example, the items corresponding to the shadow areas are preferentially used according to the construction order of the adjacent blocks in the merge list and the reference list indication information. The first target position is first mv information (i.e., item L00) in the first column of the first row in the merge list. After the item L00 is acquired, whether the item L00 is available is determined first, if so, the subsequent processings of duplicate checking and duplicate removal are executed, and if not, first mv information (i.e., item L01) in the opposite position of the first target position, i.e., the second column of the first row, is acquired, and then the subsequent processings of duplicate checking and duplicate removal are executed. Here, since mv information predicted in different directions is respectively stored in list0 and list1, the target position and the opposite position are positions where mv information in different directions is stored.

In act 203, whether the first motion information coincides with second motion information in the GPM motion information candidate list is detected to obtain a duplicate checking detection result.

In an embodiment of the present application, the motion information in the merge list is referred to as first mv information, and the motion information in the mv candidate list is referred to as second motion information (also referred to as second mv information). The first mv information and the second mv information are merely used to indicate that they are from different origins, rather than distinguishing them in terms of content.

In act 204, the GPM motion information candidate list is updated by using the first motion information based on the duplicate checking detection result to obtain a constructed GPM motion information candidate list.

In some embodiments, act 204 specifically includes: adding the first motion information to the GPM motion information candidate list w % ben the duplicate checking detection result indicates that the first motion information does not coincide with the second motion information in the GPM motion information candidate list; ignoring the current first motion information when the duplicate checking detection result indicates that the first motion information coincides with the second motion information in the GPM motion information candidate list; and acquiring next first motion information in the merge candidate list according to a preset acquisition strategy, and continuing to perform duplicate information removal processing on the next first motion information to update the GPM motion information candidate list.

That is, after the first motion information in the merge list is acquired, if second motion information same as the first motion information has existed in the motion information candidate list, it is no need to use the first motion information as a candidate item of GPM; and if second motion information same as the first motion information does not exist in the motion information candidate list, the first motion information is used as a candidate item of GPM.

The specific act of duplicate checking and duplicate removal includes: inputting an ordinary merge list mergeCandList, and outputting an mv candidate list mergeGPMCandList.

For i=0~MaxNumGpmMergeCand−1, j=0~MaxNumGpmMergeCand−1, MaxNumGpmMergeCand represents the maximum number of candidate items in the merge list, i represents an index of the second mv information in the mv candidate list, and j represents an index of the first mv information in the merge list, and the following operations are performed.

Let X=(j & 0x01), where X is the reference list indication information, which is used for indicating the usage priority of list0 and list1, X=0 indicates that the mv information in list0 is preferentially used, X=1 indicates that the mv information in list1 is preferentially used, & is a bitwise AND operation, i.e., taking out the last bit of j (similar to parity check). Accordingly, mv information predFlagLXM corresponding to the reference frame in the reference list corresponding to X is preferentially used for partition prediction. e.g., the items corresponding to the shadow areas in FIG. 8. Only when the corresponding mv is not available (the mv of the adjacent block may itself be unidirectional), the mv in the opposite position (the mv represented in the blank area horizontally corresponding to the shadow area) is used, i.e., X=1−X.

Whether item LXj in the current ordinary merge list coincides with the 0th to i−1th items in the mv candidate list is checked, if so, i remains unchanged and j is increased by 1; and if not, the following statements are executed:
mvGPMi[0]=mvLXj[0]
mvGPMi[1]=mvLXj[1]
refIdxGPMi=refIdxLXj
predListFlagGPMi=X Then i and j each is increased by 1, and when j is increased to MaxNumGpmMergeCand, execution ends.

In some embodiments, if i has not reached MaxNumGpmMergeCand−1 while j has been increased to MaxNumGpmMergeCand, the mv information with a value of 0 is subsequently added, or the mv information of the last candidate item stored previously is repeated.

Figure 10:
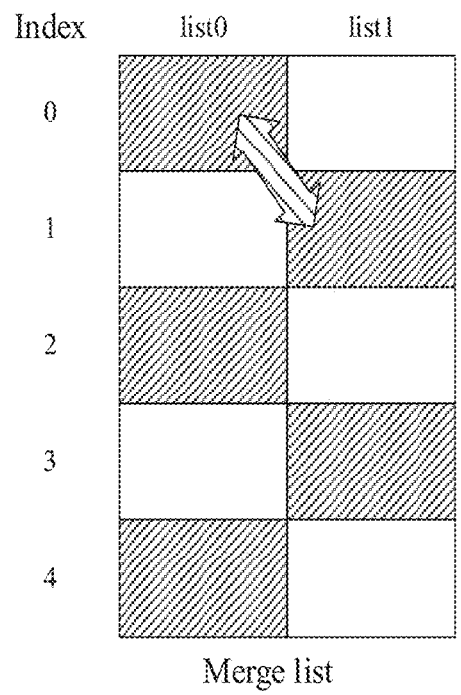
FIG. 10 is a second structure diagram of a merge list in an embodiment of the present application.
Figure 11:
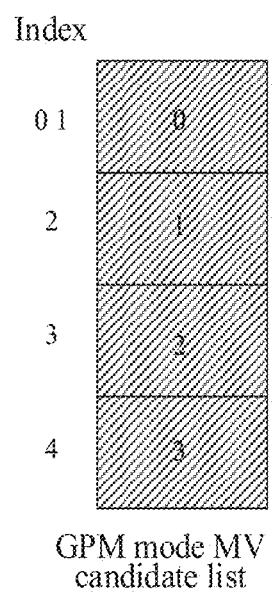
FIG. 11 is a first structure diagram of a GPM motion information candidate list in an embodiment of the present application.

FIG. 10 is a second structure diagram of a merge list in an embodiment of the present application, and FIG. 11 is a first structure diagram of a GPM motion information candidate list in an embodiment of the present application. If the mv information corresponding to list0 with the index 0 in the merge list in FIG. 10 is exactly the same as the mv information corresponding to list1 with the index 1, i.e., the two shadow areas indicated by the two-headed arrow, they will correspond to a same item in a reconstructed mv candidate list, i.e., an mv candidate list is established after duplicate removal operation is performed on the two pieces of unidirectional mv information with the indexes 0 and 1 in the merge list. The index 0 of the mv candidate list in FIG. 11 corresponds to indexes 0 and 1 in the merge list. Due to the duplicate removal operation, the indexes in the mv candidate list is reduced by one compared with the indexes in the merge list.

In some embodiments, act 204 specifically includes: adding the first motion information to the GPM motion information candidate list when the duplicate checking detection result indicates that the first motion information does not coincide with second motion information in the GPM motion information candidate list; acquiring first motion information stored in an opposite position of a position where the first motion information is located, and updating the GPM motion information candidate list by using the first motion information stored in the opposite position, when the duplicate checking detection result indicates that the first motion information coincides with the second motion information; and acquiring next first motion information in the merge candidate list according to a preset acquisition strategy, and continuing to perform duplicate information removal processing on the next first motion information to update the GPM motion information candidate list.

That is, after the first motion information in the merge list is acquired, if second motion information same as the first motion information has existed in the motion information candidate list, first motion information stored in the opposite position of the position where the first motion information is located is acquired. Taking FIG. 10 as an example, the first motion information is first motion information (i.e., item L00) in the first column of the first row in the merge list. After the item L00 is acquired, if the item L00 coincides with the 0th~ i−1th items in the motion information candidate list, in order to enrich the motion information in the motion information candidate list, it is needed to acquire the first motion information (i.e., item L01) in the opposite position, i.e., the second column of the first row, and then update the GPM motion information candidate list by using the first motion information in the opposite position.

In some embodiments, the updating the GPM motion information candidate list using the first motion information stored in the opposite position includes: performing duplicate information removal processing on the first motion information stored in the opposite position to update the GPM motion information candidate list; or adding the first motion information stored in the opposite position to the GPM motion information candidate list.

Here, duplicate information removal processing is performed on the first motion information stored in the opposite position to update the GPM motion information candidate list, i.e., whether the first motion information of the opposite position coincides with the second motion information in the GPM motion information candidate list is detected to obtain a duplicate checking detection result. When the duplicate checking detection result indicates that the first motion information of the opposite position does not coincide with the second motion information in the GPM motion information candidate list, the first motion information of the opposite position is added to the GPM motion information candidate list; and when the duplicate checking detection result indicates that the first motion information of the opposite position coincides with the second motion information in the GPM motion information candidate list, the first motion information of the opposite position is ignored.

Here, adding the first motion information stored in the opposite position to the GPM motion information candidate list refers to directly adding the first motion information of the opposite position to the motion information candidate list without performing the duplicate information removal processing on the first motion information of the opposite position.

In some other embodiments, act 103 specifically includes: constructing a first motion information candidate list corresponding to a first partition of the current block and a second motion information candidate list corresponding to a second partition of the current block respectively according to the first motion information in the merge candidate list of the current block, wherein a process of the constructing includes performing duplicate information removal processing on the first motion information. Here, the first motion information candidate list and the second motion information candidate list are both GPM motion information candidate lists.

That is, first, duplicate checking and duplicate removal are performed on the first motion information in the merge candidate list of the current block, and then a first motion information candidate list of partition A is constructed according to the mv selection strategy of partition A, and a second motion information candidate list of partition B is constructed according to the mv selection strategy of partition B.

It should be noted that the selection strategy of partition A is used to determine the usage priority of mv information and the position of the mv information arranged in the mv candidate list, and the selection strategy of partition B is used to determine the usage priority of mv information and the position of the mv information arranged in the mv candidate list, and the higher the usage priority, the more preceding the position in the mv candidate list. When the selection strategies of partition A and partition B are different, different mv candidate lists need to be constructed for partition A and partition B; and when the selection strategies of partition A and partition B are the same, a same mv candidate list may be constructed for partition A and partition B.

In some embodiments, after the GPM motion information candidate list is constructed, the method further includes: when the number of candidate items of the GPM motion information candidate list is greater than 2, acquiring, from the GPM motion information candidate list, first index information corresponding to the motion information of the first partition and second index information corresponding to the motion information of the second partition; and signaling the first index information and the second index information into a bitstream. An encoder sends the bitstream to a decoder, and the decoder parses the bitstream to determine the first index information of the motion information of the first partition and the second index information of the motion information of the second partition in the motion information candidate list, and further acquire the motion information of various partitions from the motion information candidate list established by the decoder end according to the index information.

In some other embodiments, after the GPM motion information candidate list is constructed, the method further includes; when the number of candidate items of the GPM motion information candidate list is equal to 2, acquiring, from the GPM motion information candidate list, first index information corresponding to the motion information of a first partition or second index information corresponding to the motion information of a second partition; and signaling the first index information or the second index information into a bitstream. An encoder sends the bitstream to a decoder, and the decoder parses the bitstream to determine the first index information of the motion information of the first partition in the motion information candidate list. Since the motion information candidate list contains only two candidate items, after the motion information of the first partition is determined according to the first index information, the motion information in the other candidate item is definitely the motion information of the second partition. It is similar for the decoder to parse the bitstream to determine the second index information of the motion information of the second partition in the motion information candidate list.

That is, when the number of candidate items in the motion information candidate list is greater than 2, the encoder needs to signal both the first index information and the second index information into a bitstream to indicate the decoder to acquire the motion information of various partitions according to the index information; when the number of candidate items in the motion information candidate list is equal to 2, the decoder only needs to signal one piece of index information into a bitstream, then the decoder end can acquire the motion information of various partitions according to the one piece of index information; and when the number of candidate items in the motion information candidate list is smaller than 2, the decoder only needs to signal one piece of index information into a bitstream to indicate a partition to which the candidate item belongs.

In act 104, an inter prediction value of the current block is determined according to the GPM motion information candidate list.

Specifically, a method for determining an inter prediction value of the current block includes: acquiring, from the GPM motion information candidate list, motion information for a first partition of the current block and motion information for a second partition of the current block; calculating a first prediction value of the first partition by using the motion information of the first partition, and calculating a second prediction value of the second partition by using the motion information of the second partition; and weighting and merging the first prediction value and the second prediction value to obtain the inter prediction value of the current block.

In practical applications, the method further includes: acquiring, by the encoder, weight index absolute information corresponding to pixel points in the current block, determining weight values corresponding to the weight index absolute information according to the weight indexes corresponding to the pixel points in the current block and the weight index absolute information corresponding to the pixel points in the current block, then determining a weight value of a first pixel point of the first partition and a weight value of a second pixel point of the second partition from the pixel points in the current block based on the weight values corresponding to the weight index absolute information, then determining a first weight value of a pixel point in the current block corresponding to the first partition according to the weight value of the first pixel point in the first partition and the weight value of the second pixel point in the second partition, and finally determining a second weight value of a pixel point in the current block corresponding to the second partition according to the first weight value.

In an embodiment of the present application, the encoder may complete weighting and merging of the pixel points in the current block by multiplying the first prediction value by the first weight value of each pixel point and then adding the product and a corresponding product of the second prediction value and the second weight value of each pixel point, to obtain the inter prediction value of the current block.

Specifically, after the establishment of an mv candidate list, the act of acquiring mv of the two partitions (first partition A and then partition B) includes the followings:

merge_gpm_idx0[x0][y0] indicates a position of the mv of partition A in the merge list; and let m=merge_gpm_idx0[xCb][yCb], and wait for subsequent processing;

merge_gpm_idx1[x0][y0] indicates a position of the mv of partition B in the merge list, the position of the mv of partition B in the merge list may be reduced by 1 because A first selects an item ranked more preceding; and let n=merge_gpm_idx1[xCb][yCb]+ (merge_gpm_idx1[xCb][yCb]>=m)?1:0, where n represents an actual position of the mv selected by partition B in the merge candidate list, and wait for subsequent processing.

Taking FIG. 10 as an example, if the mv information in list0 corresponding to the index 0 is exactly the same as the mv information corresponding to list1 with the index 1, they will correspond to a same item in a reconstructed mv candidate list, wherein m is the first index information, n is the second index information, and in and n correspond to the indexes 0-3 in the block in FIG. 11.

Let M=mergeGPMCandList [m], the mth item is taken from the mv candidate list of GPM mode for the mv construction of partition A. The corresponding mv information is stored in processing variables for partition A to prepare for the subsequent prediction block construction.

mvA[0]=mvGPMM[0]
mvA[1]=mvGPMM[1]
refIdxA=refIdxGPMM
predListFlagA=predListFlagGPMM Herein mvA is an mv vector, refIdxA is a reference frame corresponding to the motion vector, and predListFlagA indicates components in which list of the motion vector alternatives are currently selected.

Let N=mergeCandList[n], the nth term is taken from the mv candidate list of GPM mode for the mv construction of partition B.

mvB[0]=mvGPMN[0]
mvB[1]=mvGPMN[1]
refIdxB=refIdxGPMN
predListFlagB=predListFlagGPMN Herein mvB is an mv vector, refIdxB is a reference frame corresponding to the motion vector, and predListFlagB indicates components in which list of the motion vector alternatives is currently selected.

An embodiment of the present application further provides another method for constructing a GPM motion information candidate list. The act 202 may specifically further include: acquiring all available first motion information in the merge candidate list sequentially according to the construction order of adjacent blocks in the merge candidate list.

Taking the merge list in FIG. 10 as an example, unidirectional motion information in list0 and available unidirectional motion information in list1 in the merge list are sequentially acquired from top to bottom and from left to right, and all available unidirectional motion information is sequentially added to the GPM motion information candidate list according to an adding order of candidate items in the merge list, without any need to distinguish the use priorities of list0 and list1.

Here, mv being available means that motion information is stored in the target position. If mv of adjacent blocks of the current block is unidirectional, only one of list0 and list1 stores motion information, and the other does not store any motion information. The motion information in a reference list storing motion information is available, and the mv in a reference list not storing motion information is unavailable. If the mv of adjacent blocks of the current block is bidirectional, the mv in both list0 and list1 are available.

Further, before a motion information candidate list is constructed by using all the available motion information in the merge list, the processing of duplicate information removal also needs to be performed on the available motion information in the merge list, i.e., whether the first motion information coincides with the second motion information in the GPM motion information candidate list is detected, to obtain a duplicate checking detection result.

Correspondingly, the act 204 specifically includes: adding the first motion information to the GPM motion information candidate list when the duplicate checking detection result indicates that the first motion information does not coincide with the second motion information in the GPM motion information candidate list; ignoring the current first motion information when the duplicate checking detection result indicates that the first motion information coincides with the second motion information in the GPM motion information candidate list; and acquiring next first motion information in the merge candidate list according to a preset acquisition strategy, and continuing to perform the duplicate information removal processing on the next first motion information to update the GPM motion information candidate list.

That is, after the available first motion information in the merge list is acquired, if second motion information same as the available first motion information has existed in the motion information candidate list, there is no need to use the first motion information as a candidate item of GPM; and if second motion information same as the available first motion information does not exist in the motion information candidate list, the first motion information is used as a candidate item of GPM.

Figure 12:
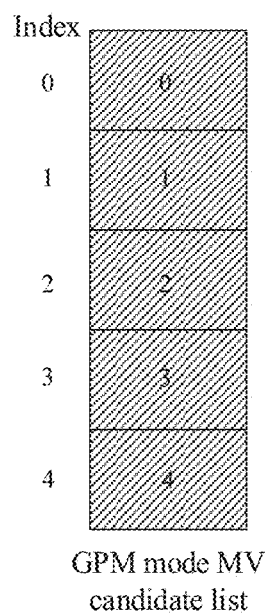
FIG. 12 is a second structure diagram of a GPM motion information candidate list in an embodiment of the present application.

FIG. 12 is a second structure diagram of a GPM motion information candidate list in an embodiment of the present application. If the mv information in the shadow areas in the merge list in FIG. 10 is all available and there is no coinciding mv information after duplicate checking is performed on the available mv in the merge list, the mv in the five shadow areas in the merge list is stored in the mv candidate list. In FIG. 12, there are 5 candidate items in the mv candidate list, with the indexes 0-4.

It should be noted that if the white areas in FIG. 10 also contain available mv information, the available mv information in the white areas also needs to be taken out for the subsequent duplicate checking and duplicate removal operations and establishment of an mv candidate list. The number of candidate items in the mv candidate list may be greater than 5.

In the above solution, at least part of the first motion information in the merge candidate list is stored in the GPM motion information candidate list. That is, after duplicate checking and duplicate removal operations are performed on the merge list, the motion information in the merge list is directly used to establish a motion information candidate list.

In some other embodiments of the present application, mapping information of at least part of the first motion information in the merge candidate list is stored in the GPM motion information candidate list. That is, after duplicate checking and duplicate removal operations are performed on the merge list, index information of the motion information in the merge list is used to establish a motion information candidate list.

Correspondingly, the act 204 may be replaced by the following act: adding mapping information of the first motion information to the GPM motion information candidate list when the duplicate checking detection result indicates that the first motion information does not coincide with the second motion information in the GPM motion information candidate list, wherein the mapping information of the first motion information includes: indexes of the first motion information in the merge candidate list and reference list indication information; ignoring the current first motion information when the duplicate checking detection result indicates that the first motion information coincides with the second motion information in the GPM motion information candidate list; and acquiring next first motion information in the merge candidate list according to a preset acquisition strategy, and continuing to perform duplicate information removal processing on the next first motion information to update the GPM motion information candidate list.

That is, after the first motion information in the merge list is acquired, if second motion information same as the first motion information has existed in the motion information candidate list, it is no need to use the first motion information as a candidate item of GPM; and if second motion information same as the first motion information does not exist in the motion information candidate list, the first motion information is used as a candidate item of GPM.

The specific act of duplicate checking and duplicate removal includes: inputting an ordinary merge list mergeCandList, and outputting an mv candidate list mapping list mergeGPMCandMapList.

For i=0~MaxNumGpmMergeCand−1, j=0~MaxNumGpmMergeCand−1, MaxNumGpmMergeCand represents the maximum number of candidate items in the merge list, i represents an index of the second mv information in the mv candidate list, and j represents an index of the first mv information in the merge list, and the following operations are performed.

Let X=(j & 0x01), where X is the reference list indication information, which is used for indicating the usage priorities of list) and list1, X=0 indicates that the mv information in list0 is preferentially used. X=1 indicates that the mv information in list1 is preferentially used, & is a bitwise AND operation. i.e., taking out the last bit of j (similar to parity check). Accordingly, mv information predFlagLXM corresponding to the reference frame in the reference list corresponding to X is preferentially used for partition prediction, e.g., the items corresponding to the shadow areas in FIG. 10. Only when the corresponding mv is not available (the mv of the adjacent block may itself be unidirectional), the mv in the opposite position (the mv represented in the blank area horizontally corresponding to the shadow area) is used, i.e., X=1-X.

Whether item LXj in the current ordinary merge list coincides with the 0th to i-1th items in the mv candidate list is checked, if so, i remains unchanged and j is increased by 1; and if not, the following statements are executed:

mergeGPMCandMapList [i][0]=j
mergeGPMCandMapList [i][1]=X

Then i and j each is increased by 1, and when j is increased to MaxNumGpmMergeCand, execution ends.

In some embodiments, if i has not reached MaxNumGpmMergeCand-1 while j has been increased to MaxNumGpmMergeCand, mapping information of the mv information with a value of 0 is subsequently added, or mapping information of the mv information of the last candidate item stored previously is repeated.

Figure 13:
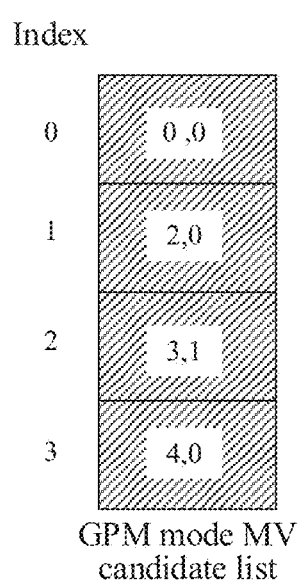
FIG. 13 is a third structure diagram of a GPM motion information candidate list in an embodiment of the present application.

An example of this process is shown in FIG. 13.

Taking FIG. 10 as an example, if the mv information corresponding to list0 with the index 0 in the merge list in FIG. 10 is exactly the same as the mv information corresponding to list1 with the index 1, i.e., the two shadow areas indicated by the two-headed arrow will correspond to a same item in a reconstructed mv candidate list, that is, an mv candidate list is established after duplicate removal operation is performed on the two pieces of unidirectional mv information with the indexes 0 and 1 in the merge list. FIG. 13 is a third structure diagram of a GPM motion information candidate list in an embodiment of the present application. In FIG. 13, two-tuple information (j, X) of mv information in a merge list is mapped, wherein j is an index of the merge list, j takes 0-4, X is reference list indication information, and X is 0 or 1. A two-tuple (0, 0) with the index 0 corresponds to item L00 in the merge list, a two-tuple (2, 0) with the index 1 corresponds to item L20 of the merge list, a two-tuple (3, 1) with the index 2 corresponds to item L31 of the merge list, and a two-tuple (4, 0) with the index 3 corresponds to item L40 of the merge list.

In some other embodiments, the above act 204 may also be replaced by the following act: adding mapping information of the first motion information to the GPM motion information candidate list w % ben the duplicate checking detection result indicates that the first motion information does not coincide with second motion information in the GPM motion information candidate list, wherein the mapping information of the first motion information includes: an index of the first motion information in the merge candidate list and reference list indication information; acquiring first motion information stored in an opposite position of a position where the first motion information is located, and updating the GPM motion information candidate list by using the first motion information stored in the opposite position, when the duplicate checking detection result indicates that the first motion information coincides with the second motion information; and acquiring next first motion information in the merge candidate list according to a preset acquisition strategy, and continuing to perform duplicate information removal processing on the next first motion information to update the GPM motion information candidate list.

That is, after the first mv information in the merge list is acquired, if second mv information same as the first mv information has existed in the mv candidate list, first mv information stored in the opposite position of the position where the first mv information is located is acquired. Taking FIG. 10 as an example, the first mv information is first mv information (i.e., item L00) in the first column of the first row in the merge list. After the item L00 is acquired, if the item L00 coincides with the 0th~i-1th items in the mv candidate list, in order to enrich the mv information in the mv candidate list, it is needed to acquire the first mv information (i.e., item L01) in the opposite position, i.e., the second column of the first row, and then update the mv candidate list by using the first mv information in the opposite position.

In some embodiments, the updating the GPM motion information candidate list using the first motion information stored in the opposite position includes: performing duplicate information removal processing on the first motion information stored in the opposite position to update the GPM motion information candidate list; or adding the first motion information stored in the opposite position to the GPM motion information candidate list.

Here, duplicate information removal processing is performed on the first motion information stored in the opposite position to update the GPM motion information candidate list, i.e., whether the first motion information of the opposite position coincides with the second motion information in the GPM motion information candidate list is detected to obtain a duplicate checking detection result. When the duplicate checking detection result indicates that the first motion information of the opposite position does not coincide with the second motion information in the GPM motion information candidate list, the mapping information of the first motion information is added to the GPM motion information candidate list; and when the duplicate checking detection result indicates that the first motion information of the opposite position coincides with the second motion information in the GPM motion information candidate list, the first motion information of the opposite position is ignored.

Here, adding the first motion information stored in the opposite position to the GPM motion information candidate list refers to directly adding the mapping information of the first motion information of the opposite position to the motion information candidate list without performing the duplicate information removal processing on the first motion information of the opposite position.

In some embodiments, after the GPM motion information candidate list is constructed, the method further includes: when the number of candidate items of the GPM motion information candidate list is greater than 2, acquiring, from the GPM motion information candidate list, first index information corresponding to the motion information of a first partition and second index information corresponding to the motion information of a second partition; and signaling the first index information and the second index information into a bitstream; or, when the number of candidate items of the GPM motion information candidate list is equal to 2, acquiring, from the GPM motion information candidate list, first index information corresponding to the motion information of the first partition or second index information corresponding to the motion information of the second partition; and signaling the first index information or the second index information into a bitstream.

Here, the first index information is used for indicating the mapping information of the motion information of the first partition in the motion information candidate list, and the second index information is used for indicating the mapping information of the motion information of the second partition in the motion information candidate list.

In practical applications, after the GPM motion information candidate list is constructed, the method further includes: acquiring, from the GPM motion information candidate list, first mapping information of the motion information for the first partition of the current block and second mapping information of the motion information for the second partition of the current block; then acquiring, from the merge candidate list, motion information corresponding to the first mapping information and motion information corresponding to the second mapping information; calculating a first prediction value of the first partition by using the motion information of the first partition, and calculating a second prediction value of the second partition by using the motion information of the second partition; and weighting and merging the first prediction value and the second prediction value to obtain the inter prediction value of the current block.

Specifically, after the establishment of an mv candidate list, the act of acquiring mv of the two partitions (first partition A and then partition B) includes the followings:

merge_gpm_idx0[x0][y0] indicates a position of the mv of partition A in the merge list; and let m=merge_gpm_idx0[xCb][yCb], and wait for subsequent processing;

merge_gpm_idx1[x0][y0] indicates a position of the mv of partition B in the merge list, the position of the mv of partition B in the merge list may be reduced by 1 because A first selects an item ranked more preceding; and let n=merge_gpm_idx1[xCb][yCb]+(merge_gpm_idx1[xCb][yCb]>=m)?1:0, where n represents an actual position of the mv selected by partition B in the merge candidate list, and wait for subsequent processing.

In the example shown in FIG. 10, if the mv information in list) corresponding to the index 0 is exactly the same as the mv information corresponding to list1 with the index 1, they will correspond to a same item in a reconstructed mv candidate list, wherein m is the first index information, n is the second index information, and m and n correspond to the indexes 0-3 in FIG. 13. Two-tuple information may be obtained according to the indexes, and the two-tuple information can map a candidate item in the merge list.

Let M=mergeCandList [mergeGPMCandMapList [m][0]], X=mergeGPMCandMapList [m][1], the mth item is taken out from the mv candidate list of GPM mode for the mv construction of partition A. The corresponding mv information is stored in processing variables for partition A, to prepare for the subsequent prediction block construction.

mvA[0]=mvLXM[0]
mvA[1]=mvLXM[1]
refIdxA=refIdxLXM
predListFlagA=X

Herein mvA is an mv vector, refIdxA is a reference frame corresponding to the motion vector, and predListFlagA indicates components in which list of the motion vector alternatives are currently selected.

Let N=mergeCandList[mergeGPMCandMapList [n][0]], X=mergeGPMCandMapList [n][1], the nth term is taken from the mv candidate list of GPM mode for the mv construction of partition B.

mvB[0]=mvLXN[0]
mvB[1]=mvLXN[1]
refIdxB=mvLXN
predListFlagB=X

Herein mvB is an mv vector, refIdxB is a reference frame corresponding to the motion vector, and predListFlagB indicates components in which list of the motion vector alternatives is currently selected.

The above mv candidate list may also consist of one item: mergeGPMCandMapList [i]=j<<1+X.

In the corresponding act of acquiring mv of the two partitions (first partition A and then partition B), taking data therefrom may be performed as follows:

let M=mergeCandList[mergeGPMCandMapList [m]]>>1], X=mergeGPMCandMapList [m]&0x01, . . .

let N=mergeCandList[mergeGPMCandMapList [n]>>1], X=mergeGPMCandMapList [n]&0x01, . . .

where & is a bitwise AND operation, and &0x01 means taking out the last bit.

With the above solution, when a GPM motion information candidate list is constructed by using a merge candidate list, first, duplicate checking and duplicate removal processing are performed on the merge candidate list, and then a motion information candidate list is constructed, so that duplicate motion information in the GPM motion information candidate list can be avoided, a length of the GPM motion information candidate list is reduced, and the expression efficiency of motion information is increased, and thus the efficiency of video encoding and decoding is improved.

Based on the above method for inter prediction of the present application, a specific inter prediction implementation process is provided, the process including the following acts.

Act 1: conditions for usage and syntax parsing

It should be noted that at present, in VTM8.0, the usage of GPM prediction mode by an encoding unit corresponding to each current block needs to meet some restrictions. As an example, these restrictions may include the followings.
 (a) A Sequence Parameter Set (SPS) allows the usage of the GPM prediction mode.
 (b) An encoding image area of the current block is a bidirectional prediction slice (B slice).
 (c) The size of the current block is limited, wherein the width and height must both be greater than or equal to 8 and smaller than or equal to 64, and the width-height ratio and the height-width ratio of the current block must both be smaller than 8.
 (d) The prediction for the current block is non-general merge prediction, non-merge_subblock prediction, non-affine prediction, and non-Composed Intra Inter Prediction (CIIP).
 (e) The GPM prediction mode is disabled for chroma components in a 4:0:0 format.

The syntax description of an encoding unit layer corresponding to the current block is as shown in Table 2.

TABLE 2

| | Descriptor |
|---|---|
| merge_data(x0, y0, cbWidth, cbHeight, cbType) { | |
| ... ... | |
|   merge_gpm_partition_idx[x0][y0] | ae(v) |
|   merge_gpm_idx0[x0][y0] | ae(v) |
|   if( MaxNumGpmMergeCand > 2 ) | |
|     merge_gpm_idx1[x0][y0] | ae(v) |
| ... ... } | |

Here, ae(v) represents a context-adaptive arithmetic entropy-coded syntax element. merge_gpm_idx0[x0][y0] indicates a position of mv of partition A in the merge list, merge_gpm_idx1[x0][y0] indicates a position of mv of partition B in the merge list, and MaxNumGpmMergeCand is determined by a length of the list after duplicate checking and duplicate removal are performed.

A merge list of the current block can be obtained by constructing the merge list in the construction order shown in FIG. 7. The process of constructing a merge candidate list is the same as the process of constructing a list in a conventional merge mode. The construction order is: a construction order of adjacent blocks in the Merge candidate list, i.e., upper adjacent block B1, left adjacent block A1, upper right adjacent block B0, lower left adjacent block A0, upper left adjacent block B2; and motion vector information of block col in the position corresponding to the reference frame is motion vector information of the adjacent blocks arranged sequentially, which distinguishes different directional sources. It should be noted that a history reference block his, average MV avg of the first and second candidate MVs, and zero motion vector 0 may also be added to the merge list.

Act 2: an mv candidate list is constructed after duplicate checking and duplicate removal are performed on the merge list constructed in act 1

Specifically, the construction may be implemented using any method for constructing a candidate list given in the above-mentioned embodiments of the present application, which will not be described repeatedly here.

Act 3: mv of two partitions (partition A first and then partition B) is acquired (a) When the mv candidate list includes mv information, the act of acquiring mv of the two partitions includes the followings:

merge_gpm_idx0[x0][y0] indicates a position of the mv of partition A in the merge list; and let m=merge_gpm_idx0[xCb][yCb], and wait for subsequent processing;

merge_gpm_idx1[x0][y0] indicates a position of the mv of partition B in the merge list, the position of the mv of partition B in the merge list may be reduced by 1 because A first selects an item ranked more preceding; and let n=merge_gpm_idx1[xCb][yCb]+(merge_gpm_idx1[xCb][yCb]>=m)?1:0, where n represents an actual position of the my selected by partition B in the merge candidate list, and wait for subsequent processing.

Taking FIG. 10 as an example, if the mv information in list0 corresponding to the index 0 is exactly the same as the mv information corresponding to list1 with the index 1, they will correspond to a same item in a reconstructed mv candidate list, wherein m and n correspond to the indexes 0-3 in the block in FIG. 11.

Let M=mergeGPMCandList [m], the mth item is taken from the mv candidate list of GPM mode for the mv construction of partition A. The corresponding mv information is stored in processing variables for partition A, to prepare for the subsequent prediction block construction.

mvA[0]=mvGPMM[0]
mvA[1]=mvGPMM[1]
refIdxA=refIdxGPMM
predListFlagA=predListFlagGPMM Herein mvA is an mv vector, refIdxA is a reference frame corresponding to the motion vector, and predListFlagA indicates components in which list of the motion vector alternatives are currently selected.

Let N=mergeCandList[n], the nth term is taken from the mv candidate list of GPM mode for the mv construction of partition B.

mvB[0]=mvGPMN[0]
mvB[1]=mvGPMN[1]
refIdxB=refIdxGPMN
predListFlagB=predListFlagGPMN Herein mvB is an mv vector, refIdxB is a reference frame corresponding to the motion vector, and predListFlagB indicates components in which list of the motion vector alternatives is currently selected.

(b) When the mv candidate list includes mapping information of the mv information, the act of acquiring mv of the two partitions includes the followings:

merge_gpm_idx0[x0][y0] indicates a position of the mv of partition A in the merge list; and let m=merge_gpm_idx0[xCb][yCb], and wait for subsequent processing;

merge_gpm_idx1[x0][y0] indicates a position of the mv of partition B in the merge list, the position of the mv of partition B in the merge list may be reduced by 1 because A first selects an item ranked more preceding; let n=merge_gpm_idx1[xCb][yCb]+(merge_gpm_idx1[xCb][yCb]>=m)?1:0, where n represents an actual position of the my selected by partition B in the merge candidate list, and wait for subsequent processing.

In the example shown in FIG. 10, if the mv information in list) corresponding to the index 0 is exactly the same as the mv information corresponding to list1 with the index 1, they will correspond to a same item in a reconstructed mv candidate list, wherein m and n correspond to the indexes 0-3 in FIG. 13, and two-tuple information in the block is obtained by mapping.

Let M=mergeCandList [mergeGPMCandMapList [m][0]], X=mergeGPMCandMapList [m][1], the mth item is taken out from the mv candidate list of GPM mode for the mv construction of partition A. The corresponding mv information is stored in processing variables for partition A, to prepare for the subsequent prediction block construction.

mvA[0]=mvLXM[0]
mvA[1]=mvLXM[1]
refIdxA=refIdxLXM
predListFlagA=X

Herein mvA is an mv vector, refIdxA is a reference frame corresponding to the motion vector, and predListFlagA indicates components in which list of the motion vector alternatives are currently selected.

Let N=mergeCandList[mergeGPMCandMapList [n][0]], X=mergeGPMCandMapList [n][1], the nth term is taken from the mv candidate list of GPM mode for the mv construction of partition B.

mvB[0]=mvLXN[0]
mvB[1]=mvLXN[1]
refIdxB=mvLXN
predListFlagB=X

Herein mvB is an mv vector, refIdxB is a reference frame corresponding to the motion vector, and predListFlagB indicates components in which list of the motion vector alternatives is currently selected.

The above mv candidate list may also consist of one item: mergeGPMCandMapList [i]=j<<1+X.

In the corresponding act of acquiring mv of the two partitions (first partition A and then partition B), taking data therefrom may be performed as follows:

let M=mergeCandList[mergeGPMCandMapList [m]>>1], X=mergeGPMCandMapList [m]&1x01, . . .
let N=mergeCandList mergeGPMCandMapList [n]>>1], X=mergeGPMCandMapList [n]&0x01, . . .

where & is a bitwise AND operation, and &0x01 means taking out the last bit.

Act 4: GPM prediction process of an encoder

The GPM mode prediction process in a corresponding encoder of VVC Draft 8 is described below in detail.

Figure 14:
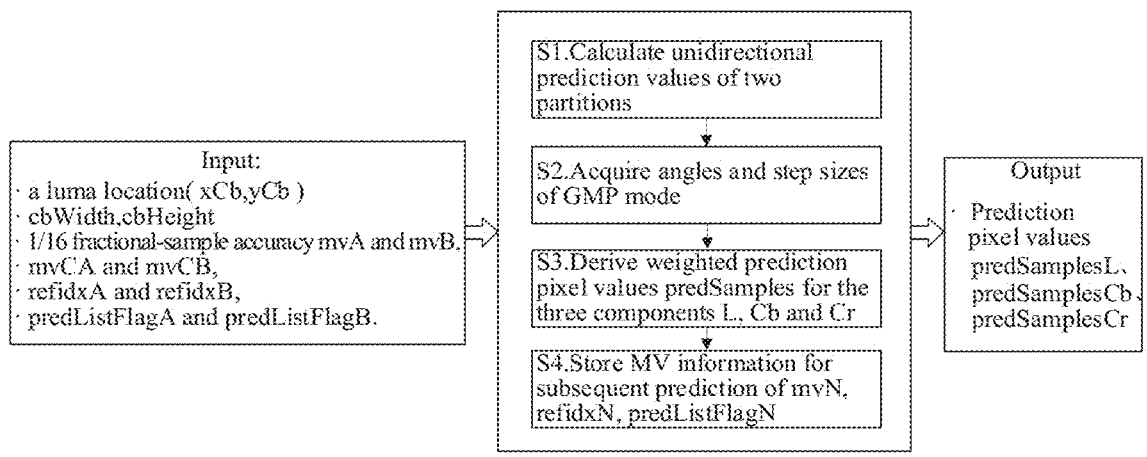
FIG. 14 is a schematic diagram of a prediction flow of a GPM mode in an embodiment of the present application.

FIG. 14 is a schematic diagram of a prediction flow of a GPM mode in an embodiment of the present application. Inputs of the prediction flow include the following contents:
- a luma location(xCb,yCb)
- cbWidth,cbHeight
- 1/16 fractional-sample accuracy mvA and mvB
- mvCA and mvCB
- refidxA and refidxB
- predListFlagA and predListFlagB.

The prediction flow for input information specifically includes S1 to S4.

In S1, unidirectional prediction values of two partitions are calculated.

The GPM mode reuses the existing conventional Merge list to construct a unidirectional Merge list belonging to the GPM according to a mode of parity check. The respective Merge candidates of the two sub-partitions after partitioning by GPM are selected from the unidirectional Merge candidate list.

Then, reference frame lists refPicLN, and sub-pixel prediction pixel values predSamplesLN are derived for three components L, Cb and Cr, where N is A or B. This act is the same as a general Inter prediction technique. That is, an existing motion compensation approach is used to calculate the respective unidirectional motion compensation prediction values of the two partitions, which are used in the final weighting and merging process of GPM in a later stage. The motion compensation process here is the same as a conventional motion compensation process, i.e., pixel values of corresponding areas are found through motion vectors, and copied.

In S2, angles and step sizes of the GPM mode are acquired
When the current prediction block uses the GPM mode, corresponding angle angleIdx and step size distanceIdx will be obtained by looking up a table according to a partitioning mode index merge_gpm_partition_idx selected by the current block. The mapping table of the partitioning mode is as shown in Table 1.

In S3, weighted prediction pixel values predSamples for the three components L, Cb and Cr are derived.

In S3.1, a prediction value of a current luma block is calculated.

S3.1.1: a weight mask matrix of the current luma block is acquired by cropping a predefined weight matrix.
1) First, acquisition of the weight matrix needs to calculate, through the current block and the partitioning mode of the current block, an offset Offset (x, y) of an upper left corner of the current block relative to an origin of coordinates, and the origin of coordinates is at a geometric center point of a block with a same size where a partitioning line at a same angle passes through the geometric center point.

Figure 15:
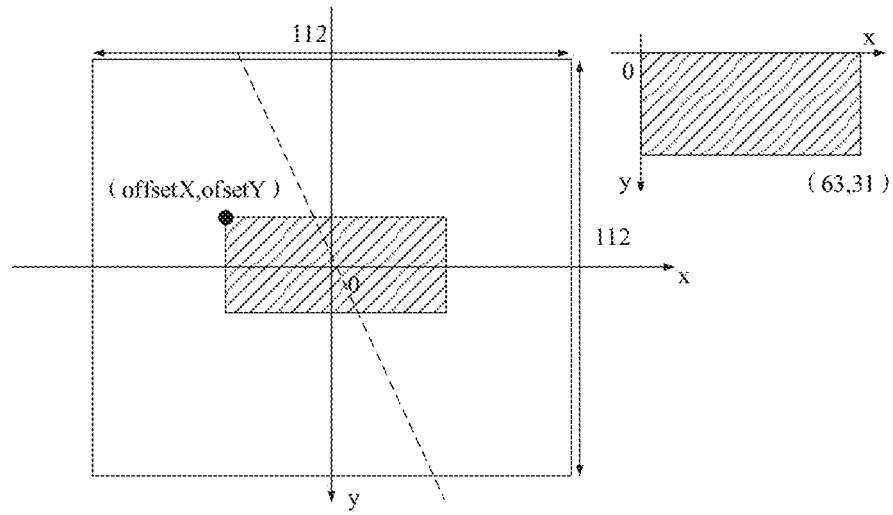
FIG. 15 is a schematic diagram of a partitioning mode of a current block in an embodiment of the present application.

FIG. 15 is a schematic diagram of a partitioning mode of a current block in an embodiment of the present application. As shown in FIG. 15, the dotted line represents the partitioning line, wherein the white background is based on the current restrictions, and the shadow area is the current block. The offset (OffsetX, OffsetX) of the upper left corner of the current block relative to the origin of coordinates is calculated through the current block and the partitioning mode of the current block, thereby determining a maximum moving range (112×112) of a block with a maximum size (64×64) relative to the coordinate system. If the partitioning line does not pass through the center point of the block, the relative position of the partitioning line is kept unchanged and the position of the block in the coordinate system is changed, so as to obtain an appropriate partition.

The followings are core parameters needed for calculation of the offset.

Since the distance d from the point (x1, y1) to the line Cos $\alpha \cdot -\sin \alpha \cdot y=0$, is equal to $\cos \alpha \cdot x1 - \sin \alpha \cdot y1$, an index number displacementX of $\alpha$ in $\cos(\alpha)$ corresponding to the current angle and a corresponding index number displacementY of $\alpha+\pi/2$ corresponding to $-\sin(\alpha)=\cos(\alpha+\pi/2)$ need to be acquired first.

$$\text{displacementX=angleIdx;} \tag{1}$$

$$\text{displacementY=(displacementX+8)\%32;} \tag{2}$$

Herein the step size used for the construction of the predefined weight matrix is merely a first step size (i.e., the partitioning line must intersect the center point of the block).

Since there is an order for the transmission of relevant information of partition A and partition B in a bitstream, a certain principle must be followed in sequencing of the two partitions, i.e., the partFlip value is calculated by the following formula, which is specifically as follows:

$$\text{partFlip=(angleIdx>=13 \&\& angleIdx<=27)?0:1} \tag{3}$$

Herein, partFlip is used for indicating the positions where partition A and partition B are distributed in the current block. Specifically, partFlip is 0, which indicates that a side where the distance weightIdx between the point and the partitioning line obtained in the subsequent formula (8) is negative is partition A. and the opposite side of the partitioning line is partition B: when partFlip is 1, it is the contrary, that is, a side where weightIdx is positive is partition A, and the opposite side (i.e., the side where weightIdx is negative) is partition B.

A key parameter shiftHor is calculated by the following two formulas:

$$\text{hwRatio=}nH/nW \tag{4}$$

i.e., the height of CU/the width of CU;

$$\text{shiftHor=(angleIdx\%16==8||(angleIdx\%16!=0 \&\&} \\ \text{hwRatio>0))?0:1} \tag{5}$$

shiftHor means determination of a direction of displacement between different partitioning lines at a same angle. If its value is 0, the partitioning line will be offset on the Y axis; and if its value is 1, the partitioning line will be offset on the X axis.

Then, according to the size and partitioning information of the current prediction block, offsets offsetX and offsetY of the current prediction block are calculated by formulas (6~7).

If shiftHor==0, the current block has an offset related to the height of the current block in a vertical direction, and the offset information at this time is as follows:

$$\text{offsetX=(-}nW\text{)>>1}$$

$$\text{offsetY=((-}nH\text{)>>1)+angleIdx<16?(distanceIdx*} \\ nH\text{)>>3: -((distanceIdx*}nH\text{)>>3)} \tag{6}$$

If an offset direction identification value is equal to 1, i.e., shiftHor is equal to 1, the current block has an offset related to the width of the current block in the vertical direction, and the offset information at this time is as follows:

$$\text{offsetX=((-}nW\text{)>>1)+angleIdx<16?(distanceIdx*} \\ nW\text{)>>3: -((distanceIdx*}nW\text{)>>3)}$$

$$\text{offsetY=(-}nH\text{)>>1} \tag{7}$$

Here "<<" represents a right shift operator, nW represents the width of the current block, and nH represents the height of the current block.

2) After the offset information offsetX and offsetY is determined, a weight index value (represented by weightIdx) at a current pixel point may be calculated through a position of a pixel point in the current block, and then a weight value at the current pixel point may be calculated by formulas (8-10) to obtain the weight matrix of the current block.

$$\text{weightIdx}=(((x*\text{subW}+\text{offsetX})<<1)+1)*\text{disLut}[\text{displacementX}]+(((y*\text{subH}+\text{offsetY})<<1)+1)*\text{disLut}[\text{displacementY}]. \quad (8)$$

$$\text{weightIdxL}=\text{partFlip}?32+\text{weightIdx}:32-\text{weightIdx} \quad (9)$$

$$\text{wValue}=\text{Clip3}(0,8,(\text{weightIdxL}+4)>>3) \quad (10)$$

Here clip3 represents a clip operator, 0 represents a lower bound value, and 8 represents an upper bound value. For example, clip3(i, j, x) indicates when x is smaller than i, its value is i; when x is greater than j, its value is j; and when x is greater than or equal to i and smaller than or equal to j, its value is x.

In addition, Table 3 provides an example of a lookup table of geometric partitioning line distance arrangement. The disLut[ ] used in formula (8) is as shown in Table 3, where subW and subH represent down-sampling rates. If the YUV format of the current block is 420 format, both subW and subH may be 2. The disLut[ ] used is as shown in Table 3. SubW and subH represent down-sampling rates, which are both 2 in the case of 420 format. Luma does not require down-sampling, and chroma weights are obtained by down-sampling luma weights, see section S3.2.

TABLE 3

| Idx | 0 | 2 | 3 | 4 | 5 | 6 | 8 | 10 | 11 | 12 | 13 | 14 |
|---|---|---|---|---|---|---|---|---|---|---|---|---|
| disLut[idx] | 8 | 8 | 8 | 4 | 4 | 2 | 0 | -2 | -4 | -4 | -8 | -8 |
| Idx | 16 | 18 | 19 | 20 | 21 | 22 | 24 | 26 | 27 | 28 | 29 | 30 |
| disLut[idx] | -8 | -8 | -8 | -4 | -4 | -2 | 0 | 2 | 4 | 4 | 8 | 8 |

Here, smaller of absolute value of weightIdx indicates a smaller distance of the current pixel point from an edge of the partition and a more even distribution of weights at the pixel point on the two partitions A and B.

In S3.1.2, weighting of unidirectional prediction values of the two partitions performed in a mode of pixel by pixel to obtain the final GPM prediction block, wherein the specific weighting calculation is shown in formula (11):

$$\text{pbSamples}[x][y]=\text{Clip3}(0,(1>>\text{BitDepth})-1,(\text{predSamplesLA}[x][y]*\text{wValue}+\text{predSamplesLB}[x][y]*(8-\text{wValue})+\text{offset1})>>\text{shift1}) \quad (11)$$

Here BitDepth represents a bit depth, offset1 is used for rounding, and shift1 is used for enabling a weighted and averaged prediction value to restore to a same bit depth as that of an input video; and the calculation of offset1 and shift1 is shown in formulas (12-13):

$$\text{shift1}=\text{Max}(5,17-\text{BitDepth}) \quad (12)$$

$$\text{offset1}=1<<(\text{shift1}-1) \quad (13)$$

In S3.2, prediction values of current chroma blocks (Cb and Ct) are calculated.

By acquiring a luma sample weight of an upper left corner of each 2*2 block in FIG. 16A directly as a chroma sample weight at the current (x,y), i.e., the luma sample weight is down-sampled, a chroma weight matrix of the current block in FIG. 16B is obtained. The calculation of chroma weighting is also shown in formula (11).

The sampling relationship of the luma and chroma weight matrixes is shown in FIGS. 16A and 16B.

In S4, MV information is stored for subsequent prediction of mvN, refidxN, predListFlagN.

The storing process is implemented by using a motion mask matrix of the current luma block. If the prediction values are completely from partition A, the motion vectors of partition A are recorded, and if the prediction values are completely from partition B, the motion vectors of partition B are recorded; otherwise, the motion vectors of both partitions are recorded at the same time. The process of calculation of a motion mask is substantially the same as the process of calculation of a luma weight matrix. First, the offset offset is calculated, and the calculation of the offset is shown in formulas (14~17).

If the offset direction identification value is equal to 0, i.e., shiftHor is equal to 0, the offset information at this time is as follows:

$$\text{offsetX}=(-\text{cbWidth})>>1 \quad (14)$$

$$\text{offsetY}=((-\text{cbHeight})>>1)+(\text{angleIdx}<16? \\ (\text{distanceIdx}*\text{cbHeight})>>3:- \\ ((\text{distanceIdx}*\text{cbHeight})>>3)) \quad (15)$$

If the offset direction identification value is equal to 1, i.e., shiftHor is equal to 1, the offset information at this time is as follows:

$$\text{offsetX}=((-\text{cbWidth})>>1)+(\text{angleIdx}<16? \\ (\text{distanceIdx}*\text{cbWidth})>>3: \\ -((\text{distanceIdx}*\text{cbWidth})>>3)) \quad (16)$$

$$\text{offsetY}=(-\text{cbHeight})>>1 \quad (17)$$

Here, cbWidth and cbHeight are the width and height of the motion mask matrix corresponding to the GPM prediction block (i.e., the width and height of the luma component of the current block).

Since the motion mask matrix of the GPM prediction blocks is still calculated in a unit of 4×4 sub-blocks, the calculation of a motion index value (which may be represented by motionIdx) at a geometric center position (4i+2, 4j+2) of each 4-4 sub-block is similar to the calculation of the weight index value weightIdx in formula (8), which is specifically as follows:

$$\text{motionIdx}=(((4*\text{xSbIdx}+\text{offsetX})<<1)+5)*\text{disLut} \\ [\text{displacementX}]+(((4*\text{ySbIdx}+\text{offsetY})<<1)+5) \\ *\text{disLut}[\text{displacementY}] \quad (18)$$

Then the mv information that needs to be stored in the current 4×4 sub-block is determined. Like in prediction weighting, whether the current sub-block is in partition A or partition B needs to be determined first.

$$\text{partIdx}=(\text{angleIdx}>=13 \,\&\&\, \text{angleIdx}<=27)?0:1 \quad (19)$$

Here (xSbIdx, ySbIdx) represents sub-block coordinates of each 4×4 sub-block (subblock, sb) in the current CU. A range of coordinates is xSbIdx=0 . . . numSbX-1 and ySbIdx=0 . . . numSbY-1, and partIdx indicates whether the two partitions need to be flipped.

$$\text{sType}=\text{abs}(\text{motionIdx})<32?2:(\text{motionIdx}<=0?(1-\text{partIdx}):\text{partIdx}) \quad (20)$$

The output of the prediction process includes: prediction pixel values predSamplesL, predSamplesCb and predSamplesCr.

In this way, whether the current sub-block stores unidirectional mv or bidirectional mv is determined according to the size of abs(motionIdx) at the geometric center position (4i+2, 4j+2) of each 4×4 sub-block. The specific determination process is as follows: if sType is 2, the current block stores the constructed bidirectional MV; otherwise, if sType is 0, the current block stores the MVA of the first partition; if sType is 1, the current block stores the MVB of the second partition. The stored mv information will be used for subsequent mv prediction of encoding blocks.

Act 5: encoding process of the related syntax of GPM prediction mode by an encoder In the encoder. GPM and other inter prediction modes are regarded as competing modes, selections are made among the modes according to Rate Distortion Optimization (RDO) or other strategies, and a selection result is transmitted to the decoder end in a form of syntax elements in the bitstream. That is, the signaling operation of the syntax described in section 1). This process is contrary to the parsing process. First, m and n, i.e., the position information of reference items selected by the two partitions A and B in the merge list respectively, are obtained, and then the syntax elements are assigned with values according to the following formulas.

$$merge\_gpm\_idx0[xCb][yCb]=m$$

$$merge\_gpm\_idx1[xCb][yCb]=n-(merge\_gpm\_idx1[xCb][yCb]>=m)?1:0$$

They are then binarized and entropy coded, and finally signaled into the bitstream for transmission.

Figure 17:
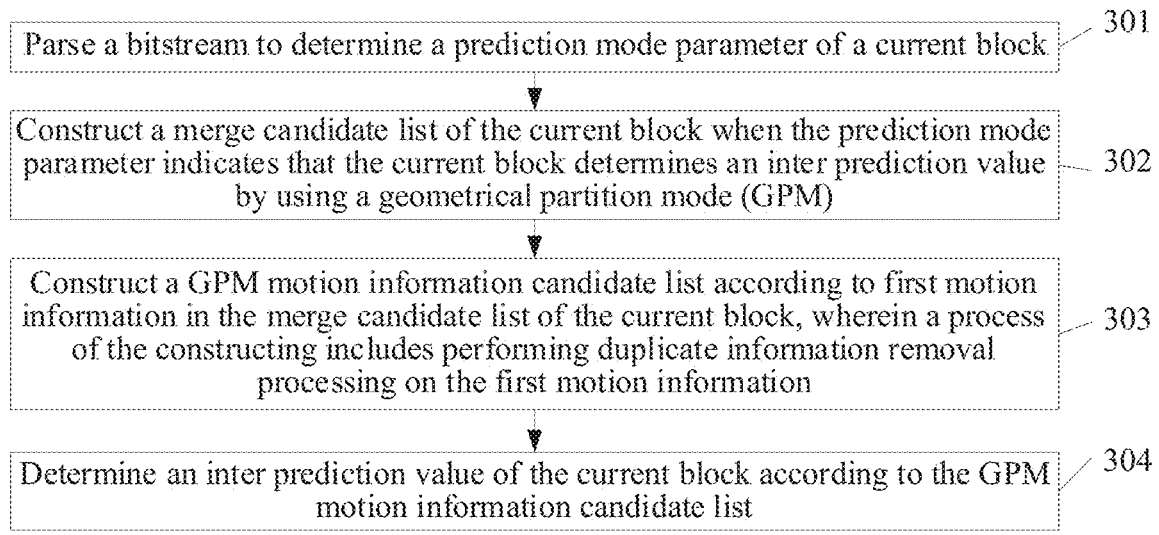
FIG. 17 is a second schematic flowchart of a method for inter prediction according to an embodiment of the present application.

FIG. 17 is a second schematic flowchart of a method for inter prediction according to an embodiment of the present application, which is applied to a decoder. As shown in FIG. 17, the method including the following acts S301 to S304.

In act 301, a bitstream is parsed to determine a prediction mode parameter of a current block.

In act 302, a merge candidate list of the current block is constructed when the prediction mode parameter indicates that the current block determines an inter prediction value by using a geometrical partition mode (GPM).

In act 303, a GPM motion information candidate list is constructed according to first motion information in the merge candidate list of the current block, wherein a processing of the constructing includes performing duplicate information removal processing on the first motion information.

In act 304, an inter prediction value of the current block is determined according to the GPM motion information candidate list.

In some embodiments, the constructing a GPM motion information candidate list according to first motion information in the merge candidate list of the current block includes: initializing the GPM motion information candidate list of the current block; sequentially acquiring first motion information in the merge candidate list according to a preset acquisition strategy; detecting whether the first motion information coincides with second motion information in the GPM motion information candidate list to obtain a duplicate checking detection result; and updating the GPM motion information candidate list by using the first motion information based on the duplicate checking detection result to obtain a constructed GPM motion information candidate list.

In some embodiments, the sequentially acquiring first motion information in the merge candidate list according to a preset acquisition strategy includes: sequentially acquiring first motion information in the merge candidate list according to a construction order of adjacent blocks in the merge candidate list and reference list indication information; wherein the reference list indication information is used for indicating preferentially used motion information of the first reference list or preferentially used motion information of the second reference list.

That is, first motion information in list0 or list1 indicated by the reference list indication information in each item is selected from top to bottom in the merge list according to the construction order of adjacent blocks, and duplicate checking and duplicate removal processing are performed on the first motion information taken out.

In some embodiments, the sequentially acquiring first motion information in the merge candidate list according to the construction order of adjacent blocks in the merge candidate list and the reference list indication information includes: determining a target position of the merge candidate list according to the construction order of the adjacent blocks in the merge candidate list and the reference list indication information; acquiring first motion information stored in the target position if the first motion information in the target position is available; and acquiring first motion information stored in an opposite position of the target position if the first motion information in the target position is not available.

In some other embodiments, the sequentially acquiring first motion information in the merge candidate list according to a preset acquisition strategy includes: sequentially acquiring all available first motion information in the merge candidate list according to a construction order of adjacent blocks in the merge candidate list.

In some embodiments, the specific duplicate removal act may include: adding the first motion information to the GPM motion information candidate list when the duplicate checking detection result indicates that the first motion information does not coincide with the second motion information in the GPM motion information candidate list; ignoring the current first motion information when the duplicate checking detection result indicates that the first motion information coincides with the second motion information in the GPM motion information candidate list; and acquiring next first motion information in the merge candidate list according to a preset acquisition strategy, and continuing to perform duplicate information removal processing on the next first motion information to update the GPM motion information candidate list.

In some embodiments, the specific duplicate removal act may further include: adding the first motion information to the GPM motion information candidate list when the duplicate checking detection result indicates that the first motion information does not coincide with second motion information in the GPM motion information candidate list; acquiring first motion information stored in an opposite position of a position where the first motion information is located, and updating the GPM motion information candidate list by using the first motion information stored in the opposite position, when the duplicate checking detection result indicates that the first motion information coincides with the second motion information; and acquiring next first motion information in the merge candidate list according to a preset acquisition strategy, and continuing to perform duplicate information removal processing on the next first motion information to update the GPM motion information candidate list.

In some embodiments, the updating the GPM motion information candidate list using the first motion information stored in the opposite position includes: performing duplicate information removal processing on the first motion information stored in the opposite position to update the GPM motion information candidate list; or adding the first motion information stored in the opposite position to the GPM motion information candidate list.

Here, duplicate information removal processing is performed on the first motion information stored in the opposite position to update the GPM motion information candidate list, i.e., whether the first motion information of the opposite position coincides with the second motion information in the GPM motion information candidate list is detected to obtain a duplicate checking detection result; when the duplicate checking detection result indicates that the first motion information of the opposite position does not coincide with the second motion information in the GPM motion information candidate list, the first motion information of the opposite position is added to the GPM motion information candidate list; and when the duplicate checking detection result indicates that the first motion information of the opposite position coincides with the second motion information in the GPM motion information candidate list, the first motion information of the opposite position is ignored.

Here, adding the first motion information stored in the opposite position to the GPM motion information candidate list refers to directly adding the first motion information of the opposite position to the motion information candidate list without performing the duplicate information removal processing on the first motion information of the opposite position.

In some embodiments, at least part of the first motion information in the merge candidate list is stored in the GPM motion information candidate list, or mapping information of at least part of the first motion information in the merge candidate list is stored in the GPM motion information candidate list.

In some embodiments, when mapping information of at least part of the first motion information in the merge candidate list is stored in the GPM motion information candidate list, the adding the first motion information to the GPM motion information candidate list includes: adding the mapping information of the first motion information to the GPM motion information candidate list, wherein the mapping information of the first motion information includes: an index of the first motion information in the merge candidate list and reference list indication information.

In some embodiments, the constructing a GPM motion information candidate list according to first motion information in the merge candidate list of the current block includes: constructing a first motion information candidate list corresponding to the first partition of the current block and a second motion information candidate list corresponding to the second partition of the current block respectively according to the first motion information in the merge candidate list of the current block, wherein a process of the constructing includes performing duplicate information removal processing on the first motion information.

That is, first, duplicate checking and duplicate removal are performed on the first motion information in the merge candidate list of the current block, and then a first motion information candidate list of partition A is constructed according to a mv selection strategy of partition A, and a second motion information candidate list of partition B is constructed according to a mv selection strategy of partition B.

It should be noted that the selection strategy of partition A is used to determine the usage priority of motion information and the position of the motion information arranged in the motion information candidate list, and the selection strategy of partition B is used to determines the usage priority of motion information and the position of the motion information arranged in the motion information candidate list, and the higher the usage priority, the more preceding the position in the motion information candidate list. When the selection strategies of partition A and partition B are different, different motion information candidate lists need to be constructed for partition A and partition B; and when the selection strategies of partition A and partition B are the same, a same motion information candidate list may be constructed for partition A and partition B.

In some embodiments, after the GPM motion information candidate list is constructed, the method further includes: parsing a bitstream to determine first index information corresponding to motion information of the first partition of the current block and second index information corresponding to motion information of the second partition of the current block in the GPM motion information candidate list; acquiring the motion information of the first partition from the GPM motion information candidate list based on the first index information; acquiring the motion information of the second partition from the GPM motion information candidate list based on the second index information; calculating a first prediction value of the first partition using the motion information of the first partition, and calculating a second prediction value of the second partition using the motion information of the second partition; and weighting and merging the first prediction value and the second prediction value to obtain an inter prediction value of the current block.

Specifically, the bitstream is parsed, when the number of candidate items in the GPM motion information candidate list is greater than 2, the first index information corresponding to the motion information of the first partition and the second index information corresponding to the motion information of the second partition are acquired from the GPM motion information candidate list; when the number of candidate items of the GPM motion information candidate list is equal to 2, the first index information corresponding to the motion information of the first partition or the second index information corresponding to the motion information of the second partition is acquired from the GPM motion information candidate list.

In practical applications, the method further includes: acquiring, by the encoder, weight index absolute information corresponding to pixel points in the current block, determining weight values corresponding to the weight index absolute information according to the weight indexes corresponding to the pixel points in the current block and the weight index absolute information corresponding to the pixel points in the current block, then determining a weight value of a first pixel point of the first partition and a weight value of a second pixel point of the second partition from the pixel points in the current block based on the weight values corresponding to the weight index absolute information, then determining a first weight value of a pixel points in the current block corresponding to the first partition according to the weight value of the first pixel point in the first partition and the weight value of the second pixel point in the second partition, and finally determining a second weight value of a pixel point in the current block corresponding to the second partition according to the first weight value.

In an embodiment of the present application, the encoder may complete weighting and merging of the pixel points in the current block by multiplying the first prediction value by the first weight value of each pixel point and then adding the product and a corresponding product of the second prediction value and the second weight value of each pixel point, to obtain the inter prediction value of the current block.

In practical applications, the decoder parses the bitstream to acquire the first index information of the first partition and the second index information of the second partition, and then determine the motion information of respective partitions from the motion information candidate list established by the decoder according to the index information. The way of constructing a GPM motion information candidate list by performing duplicate checking and duplicate removal operations on the merge list at decoder end is the same as that at the encoder end, and other inter prediction processes at the decoder end are the same as those at the encoder end, they will not be described repeatedly here.

With the above solution, in the process of inter prediction by the decoder, when a GPM motion information candidate list is constructed by using a merge candidate list, first, duplicate checking and duplicate removal processing are performed on the merge candidate list, and then a motion information candidate list is constructed, so that duplicate motion information in the GPM motion information candidate list can be avoided, a length of the GPM motion information candidate list is reduced, and the expression efficiency of motion information is increased, and thus the efficiency of video encoding and decoding is improved.

Figure 18:
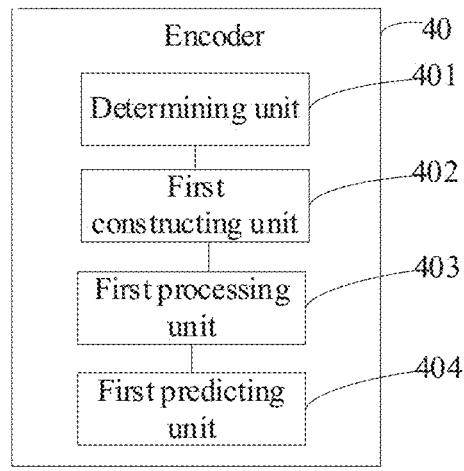
FIG. 18 is a first structure diagram of an encoder according to an embodiment of the present application.

An embodiment of the present application provides an encoder. FIG. 18 is a first structure diagram of an encoder according to an embodiment of the present application. As shown in FIG. 18, the encoder 40 includes: a determining unit 401, a first constructing unit 402, a first processing unit 403 and a first predicting unit 404.

The determining unit 401 is configured to determine a prediction mode parameter of a current block.

The first constructing unit 402 is configured to construct a merge candidate list of the current block when the prediction mode parameter indicates that the current block determines an inter prediction value by using a geometrical partition mode (GPM).

The first processing unit 403 is configured to construct a GPM motion information candidate list according to first motion information in the merge candidate list of the current block, wherein a process of the constructing includes performing duplicate information removal processing on the first motion information.

The first predicting unit 404 is configured to determine an inter prediction value of the current block according to the GPM motion information candidate list.

In some embodiments of the present application, the first processing unit 403 is specifically configured to initialize the GPM motion information candidate list of the current block; sequentially acquiring first motion information in the merge candidate list according to a preset acquisition strategy; detect whether the first motion information coincides with second motion information in the GPM motion information candidate list to obtain a duplicate checking detection result; and update the GPM motion information candidate list by using the first motion information based on the duplicate checking detection result to obtain a constructed GPM motion information candidate list.

In some embodiments of the present application, the first processing unit 403 is specifically configured to sequentially acquire first motion information in the merge candidate list according to the construction order of adjacent blocks in the merge candidate list and the reference list indication information; wherein the reference list indication information is used for indicating preferentially used motion information of the first reference list or preferentially used motion information of the second reference list.

In some embodiments of the present application, the first processing unit 403 is specifically configured to determine a target position of the merge candidate list according to the construction order of the adjacent blocks in the merge candidate list and the reference list indication information; acquire first motion information stored in the target position if the first motion information in the target position is available; and acquire first motion information stored in an opposite position of the target position if the first motion information in the target position is not available.

In some embodiments of the present application, the first processing unit 403 is specifically configured to sequentially acquire all available first motion information in the merge candidate list according to a construction order of adjacent blocks in the merge candidate list.

In some embodiments of the present application, the first processing unit 403 is specifically configured to add the first motion information to the GPM motion information candidate list when the duplicate checking detection result indicates that the first motion information does not coincide with the second motion information in the GPM motion information candidate list; ignore the current first motion information when the duplicate checking detection result indicates that the first motion information coincides with the second motion information in the GPM motion information candidate list; or acquire first motion information stored in an opposite position of a position where the first motion information is located, and update the GPM motion information candidate list by using the first motion information stored in the opposite position, when the duplicate checking detection result indicates that the first motion information coincides with the second motion information; and acquire next first motion information in the merge candidate list according to a preset acquisition strategy, and continue to perform duplicate information removal processing on the next first motion information to update the GPM motion information candidate list.

In some embodiments of the present application, the first processing unit 403 is specifically configured to perform duplicate information removal processing on the first motion information stored in the opposite position to update the GPM motion information candidate list; or add the first motion information stored in the opposite position to the GPM motion information candidate list.

In some embodiments of the present application, at least part of the first motion information in the merge candidate list is stored in the GPM motion information candidate list, or mapping information of at least part of the first motion information in the merge candidate list is stored in the GPM motion information candidate list.

In some embodiments of the present application, when mapping information of at least part of the first motion information in the merge candidate list is stored in the GPM motion information candidate list, the first processing unit 403 is specifically configured to add the mapping information of the first motion information to the GPM motion information candidate list, wherein the mapping information of the first motion information includes: an index of the first motion information in the merge candidate list and reference list indication information.

In some embodiments of the present application, the first processing unit 403 is specifically configured to construct a first motion information candidate list corresponding to the first partition of the current block and a second motion information candidate list corresponding to the second partition of the current block respectively according to the first motion information in the merge candidate list of the current block, wherein a of the constructing process includes performing duplicate information removal processing on the first motion information.

In some embodiments of the present application, the first predicting unit 404 is specifically configured to acquire, from the GPM motion information candidate list, motion information for a first partition of the current block and motion information for a second partition of the current block; calculate a first prediction value of the first partition by using the motion information of the first partition, and calculate a second prediction value of the second partition by using the motion information of the second partition; and weight and merge the first prediction value and the second prediction value to obtain the inter prediction value of the current block.

In some embodiments of the present application, the encoder 40 further includes: a signaling unit (not shown in the figure), configured to, when the number of candidate items of the GPM motion information candidate list is greater than 2, acquire, from the GPM motion information candidate list, first index information corresponding to the motion information of the first partition and second index information corresponding to the motion information of the second partition, and signal the first index information and the second index information into a bitstream.

The signaling unit is further configured to when the number of candidate items of the GPM motion information candidate list is equal to 2, acquire, from the GPM motion information candidate list, first index information corresponding to the motion information of the first partition or second index information corresponding to the motion information of the second partition, and signal the first index information or the second index information into a bitstream.

Figure 19:
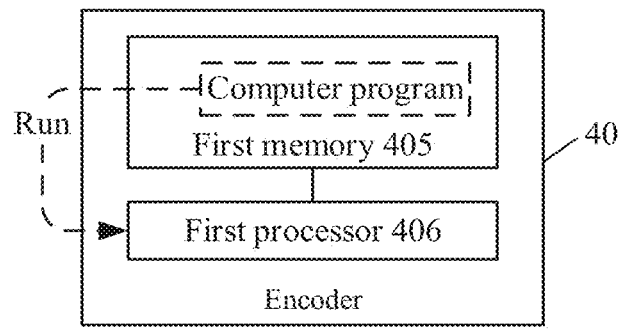
FIG. 19 is a second structure diagram of an encoder according to an embodiment of the present application.

In practical applications, an embodiment of the present application further provides an encoder. FIG. 19 is a second structure diagram of an encoder according to an embodiment of the present application. As shown in FIG. 19, the encoder 40 includes: a first memory 405 and a first processor 406.

The first memory 405 stores a computer program runnable on the first processor 406, and when the first processor 406 executes the program, the method for inter prediction at the encoder side is implemented.

With the above solution, in the process of inter prediction by the encoder, w % ben a GPM motion information candidate list is constructed by using a merge candidate list, first, duplicate checking and duplicate removal processing are performed on the merge candidate list, and then a motion information candidate list is constructed, so that duplicate motion information in the GPM motion information candidate list can be avoided, a length of the GPM motion information candidate list is reduced, and the expression efficiency of motion information is increased, and thus the efficiency of video encoding and decoding is improved.

Figure 20:
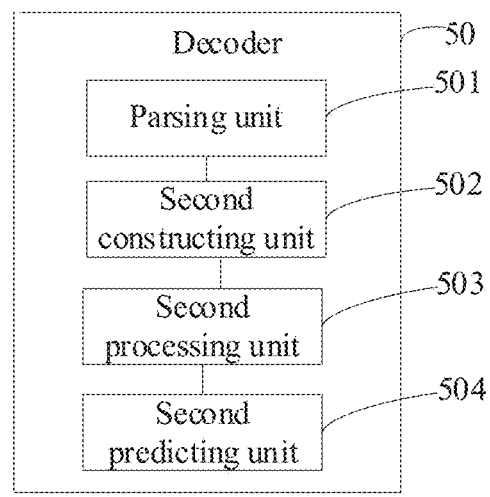
FIG. 20 is a first structure diagram of a decoder according to an embodiment of the present application.

An embodiment of the present application provides a decoder. FIG. 20 is a first structure diagram of a decoder according to an embodiment of the present application. As shown in FIG. 20, the decoder 50 includes: a parsing unit 501, a second constructing unit 502, a second processing unit 503 and a second predicting unit 504.

The parsing unit 501 is configured to parse a bitstream to determine a prediction mode parameter of a current block.

The second constructing unit 502 is configured to construct a merge candidate list of the current block when the prediction mode parameter indicates that the current block determines an inter prediction value by using a geometrical partition mode (GPM).

The second processing unit 503 is configured to construct a GPM motion information candidate list according to first motion information in the merge candidate list of the current block, wherein a process of the constructing includes performing duplicate information removal processing on the first motion information.

The second predicting unit 504 is configured to determine an inter prediction value of the current block according to the GPM motion information candidate list.

In some embodiments of the present application, the second processing unit 503 is specifically configured to initialize the GPM motion information candidate list of the current block; sequentially acquiring first motion information in the merge candidate list according to a preset acquisition strategy; detect whether the first motion information coincides with second motion information in the GPM motion information candidate list to obtain a duplicate checking detection result; and update the GPM motion information candidate list by using the first motion information based on the duplicate checking detection result to obtain a constructed GPM motion information candidate list.

In some embodiments of the present application, the second processing unit 503 is specifically configured to sequentially acquire first motion information in the merge candidate list according to a construction order of adjacent blocks in the merge candidate list and reference list indication information; wherein the reference list indication information is used for indicating preferentially used motion information of the first reference list or preferentially used motion information of the second reference list.

In some embodiments of the present application, the second processing unit 503 is specifically configured to determine a target position of the merge candidate list according to the construction order of the adjacent blocks in the merge candidate list and the reference list indication information; acquire first motion information stored in the target position if the first motion information in the target position is available; and acquire first motion information stored in an opposite position of the target position if the first motion information in the target position is not available.

In some embodiments of the present application, the second processing unit 503 is specifically configured to sequentially acquire all available first motion information in the merge candidate list according to a construction order of adjacent blocks in the merge candidate list.

In some embodiments of the present application, the second processing unit 503 is specifically configured to add the first motion information to the GPM motion information candidate list when the duplicate checking detection result indicates that the first motion information does not coincide with the second motion information in the GPM motion information candidate list; ignore the current first motion information when the duplicate checking detection result indicates that the first motion information coincides with the second motion information in the GPM motion information candidate list; or acquire first motion information stored in an opposite position of a position where the first motion information is located, and update the GPM motion information candidate list by using the first motion information stored in the opposite position, when the duplicate checking detection result indicates that the first motion information coincides with the second motion information; and acquire next first motion information in the merge candidate list according to a preset acquisition strategy, and continue to perform duplicate information removal processing on the next first motion information to update the GPM motion information candidate list.

In some embodiments of the present application, the second processing unit 503 is specifically configured to perform duplicate information removal processing on the first motion information stored in the opposite position to update the GPM motion information candidate list; or add the first motion information stored in the opposite position to the GPM motion information candidate list.

In some embodiments of the present application, at least part of the first motion information in the merge candidate list is stored in the GPM motion information candidate list, or mapping information of at least part of the first motion information in the merge candidate list is stored in the GPM motion information candidate list.

In some embodiments of the present application, when mapping information of at least part of the first motion information in the merge candidate list is stored in the GPM motion information candidate list, the second processing unit 503 is specifically configured to add the mapping information of the first motion information to the GPM motion information candidate list, wherein the mapping information of the first motion information includes: an index of the first motion information in the merge candidate list and reference list indication information.

In some embodiments of the present application, the second processing unit 503 is specifically configured to construct a first motion information candidate list corresponding to the first partition of the current block and a second motion information candidate list corresponding to the second partition of the current block respectively according to the first motion information in the merge candidate list of the current block, wherein a process of the constructing includes performing duplicate information removal processing on the first motion information.

In some embodiments of the present application, the second predicting unit 504 is specifically configured to parse a bitstream to determine first index information corresponding to motion information of the first partition of the current block and second index information corresponding to motion information of the second partition of the current block in the GPM motion information candidate list; acquire the motion information of the first partition from the GPM motion information candidate list based on the first index information; acquire the motion information of the second partition from the GPM motion information candidate list based on the second index information; calculate a first prediction value of the first partition using the motion information of the first partition, and calculate a second prediction value of the second partition using the motion information of the second partition; and weight and merge the first prediction value and the second prediction value to obtain an inter prediction value of the current block.

Figure 21:
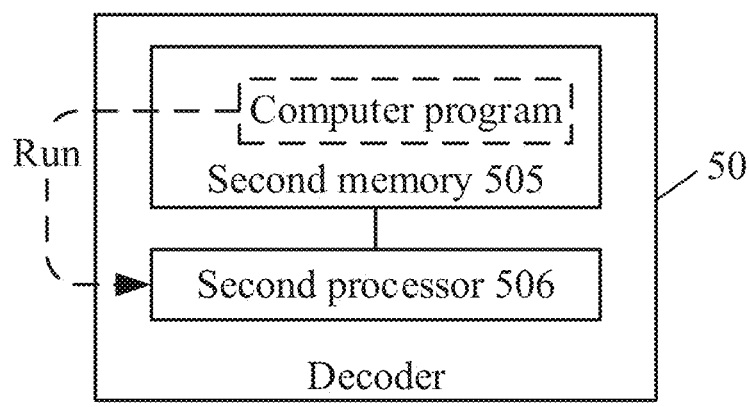
FIG. 21 is a second structure diagram of a decoder according to an embodiment of the present application.

In practical applications, an embodiment of the present application further provides a decoder. FIG. 21 is a second structure diagram of a decoder according to an embodiment of the present application. As shown in FIG. 21, the decoder 50 includes: a second memory 505 and a second processor 506.

The second memory 505 stores a computer program runnable on the second processor 506, and when the second processor 506 executes the program, the method for inter prediction at the decoder side is implemented.

Understandably, in the process of inter prediction by the decoder, when a GPM motion information candidate list is constructed by using a merge candidate list, first, duplicate checking and duplicate removal processing are performed on the merge candidate list, and then a motion information candidate list is constructed, so that duplicate motion information in the GPM motion information candidate list can be avoided, a length of the GPM motion information candidate list is reduced, and the expression efficiency of motion information is increased, and thus the efficiency of video encoding and decoding is improved.

In addition, various functional modules in the embodiment may be integrated into one processing unit, or various units may physically exist respectively, or two or more than two units may be integrated into one unit. The integrated unit may be implemented in a form of hardware, or may be implemented in a form of a software functional module.

Correspondingly, an embodiment of the present application provides a storage medium on which a computer program is stored, when the computer program is executed by the first processor, the method for inter prediction of an encoder is implemented; or when the computer program is executed by the second processor, the method for inter prediction of a decoder is implemented.

It should be pointed out here that the above storage medium and the apparatus embodiments are described similarly to the above method embodiments, and have similar beneficial effects to the method embodiments. Technical details not disclosed in the description for the storage medium and the apparatus embodiments of the present application will be understood with reference to the description for the method embodiments of the present application.

The above are merely implementations of the present application. However, the protection scope of the present application is not limited thereto. Any variation or substitution that may easily occur to a person skilled in the art within the technical scope disclosed by the present application shall be included within the protection scope of the present application. Therefore, the protection scope of the present application shall be subject to the protection scope of the claims.

INDUSTRIAL APPLICABILITY

In the embodiments of the present application, a prediction mode parameter of a current block is determined; a merge candidate list of the current block is constructed when the prediction mode parameter indicates that the current block determines an inter prediction value by using a geometrical partition mode (GPM); a GPM motion information candidate list is constructed according to first motion information in the merge candidate list of the current block; and an inter prediction value of the current block is determined according to the GPM motion information candidate list. In this way, when a GPM motion information candidate list is constructed by using a merge candidate list, first, duplicate checking and duplicate removal processing are performed on the merge candidate list, and then a motion information candidate list is constructed, so that duplicate motion information in the GPM motion information candidate list can be avoided, the length of the GPM motion information candidate list is reduced, and the expression efficiency of motion information is increased, and thus the efficiency of video encoding and decoding is improved.

The invention claimed is:

1. A method for inter prediction, applied to an encoder, the method comprising:
   determining a prediction mode parameter of a current block;

constructing a merge candidate list of the current block when the prediction mode parameter indicates that the current block determines an inter prediction value by using a geometrical partition mode (GPM);
constructing a GPM motion information candidate list according to first motion information in the merge candidate list of the current block, wherein a process of the constructing comprises performing duplicate information removal processing on the first motion information; and
determining an inter prediction value of the current block according to the GPM motion information candidate list;
wherein the constructing a GPM motion information candidate list according to first motion information in the merge candidate list of the current block comprises:
initializing the GPM motion information candidate list of the current block;
sequentially acquiring the first motion information in the merge candidate list according to a preset acquisition strategy;
detecting whether the first motion information coincides with second motion information in the GPM motion information candidate list to obtain a duplicate checking detection result; and
updating the GPM motion information candidate list by using the first motion information based on the duplicate checking detection result to obtain a constructed GPM motion information candidate list;
wherein the sequentially acquiring the first motion information in the merge candidate list according to a preset acquisition strategy comprises:
sequentially acquiring the first motion information in the merge candidate list according to a construction order of adjacent blocks in the merge candidate list and reference list indication information; wherein the reference list indication information is used for indicating preferentially used motion information of a first reference list or preferentially used motion information of a second reference list;
wherein the sequentially acquiring the first motion information in the merge candidate list according to a construction order of adjacent blocks in the merge candidate list and reference list indication information comprises:
determining target positions of the adjacent blocks of the merge candidate list according to the construction order of the adjacent blocks in the merge candidate list and the reference list indication information;
for each of the adjacent blocks, if first motion information in a target position is available, acquiring the first motion information stored in the target position; and if the first motion information in the target position is not available, acquiring first motion information stored in an opposite position of the target position; wherein the target position and the opposite position are positions where motion information in different directions is stored;
wherein the updating the GPM motion information candidate list by using the first motion information based on the duplicate checking detection result comprises:
adding the first motion information to the GPM motion information candidate list when the duplicate checking detection result indicates that the first motion information does not coincide with the second motion information in the GPM motion information candidate list;
acquiring first motion information stored in an opposite position of a position where the first motion information is located, and updating the GPM motion information candidate list by using the first motion information stored in the opposite position, when the duplicate checking detection result indicates that the first motion information coincides with the second motion information; and
acquiring next first motion information in the merge candidate list according to the preset acquisition strategy, and continuing to perform duplicate information removal processing on the next first motion information to update the GPM motion information candidate list.

2. The method according to claim 1, wherein the updating the GPM motion information candidate list by using the first motion information stored in the opposite position comprises:
performing duplicate information removal processing on the first motion information stored in the opposite position to update the GPM motion information candidate list;
or adding the first motion information stored in the opposite position to the GPM motion information candidate list.

3. The method according to claim 1, wherein at least part of the first motion information in the merge candidate list is stored in the GPM motion information candidate list, or mapping information of at least part of the first motion information in the merge candidate list is stored in the GPM motion information candidate list;
wherein when mapping information of at least part of the first motion information in the merge candidate list is stored in the GPM motion information candidate list, the adding the first motion information to the GPM motion information candidate list comprises:
adding mapping information of the first motion information to the GPM motion information candidate list, wherein the mapping information of the first motion information comprises: an index of the first motion information in the merge candidate list and reference list indication information.

4. The method according to claim 1, wherein the constructing a GPM motion information candidate list according to first motion information in the merge candidate list of the current block comprises:
constructing a first motion information candidate list corresponding to a first partition of the current block and a second motion information candidate list corresponding to a second partition of the current block respectively according to the first motion information in the merge candidate list of the current block, wherein a process of the constructing comprises performing duplicate information removal processing on the first motion information.

5. The method according to claim 1, wherein the determining an inter prediction value of the current block according to the GPM motion information candidate list comprises:
acquiring, from the GPM motion information candidate list, motion information for a first partition of the current block and motion information for a second partition of the current block;
calculating a first prediction value of the first partition by using the motion information of the first partition, and calculating a second prediction value of the second partition by using the motion information of the second partition; and weighting and merging the first prediction value and the second prediction value to obtain the inter prediction value of the current block;

wherein after constructing the GPM motion information candidate list, the method further comprises:

when a number of candidate items of the GPM motion information candidate list is greater than 2, acquiring, from the GPM motion information candidate list, first index information corresponding to the motion information of the first partition and second index information corresponding to the motion information of the second partition; and signaling the first index information and the second index information into a bitstream;

when the number of candidate items of the GPM motion information candidate list is equal to 2, acquiring, from the GPM motion information candidate list, the first index information corresponding to the motion information of the first partition or the second index information corresponding to the motion information of the second partition; and signaling the first index information or the second index information into a bitstream.

6. A method for inter prediction, applied to a decoder, the method comprising:

parsing a bitstream to determine a prediction mode parameter of a current block;

constructing a merge candidate list of the current block when the prediction mode parameter indicates that the current block determines an inter prediction value by using a geometrical partition mode (GPM);

constructing a GPM motion information candidate list according to first motion information in the merge candidate list of the current block, wherein a process of the constructing comprises performing duplicate information removal processing on the first motion information; and determining an inter prediction value of the current block according to the GPM motion information candidate list;

wherein the constructing a GPM motion information candidate list according to first motion information in the merge candidate list of the current block comprises:

initializing the GPM motion information candidate list of the current block;

sequentially acquiring the first motion information in the merge candidate list according to a preset acquisition strategy;

detecting whether the first motion information coincides with second motion information in the GPM motion information candidate list to obtain a duplicate checking detection result; and updating the GPM motion information candidate list by using the first motion information based on the duplicate checking detection result to obtain a constructed GPM motion information candidate list;

wherein the sequentially acquiring the first motion information in the merge candidate list according to a preset acquisition strategy comprises:

sequentially acquiring the first motion information in the merge candidate list according to a construction order of adjacent blocks in the merge candidate list and reference list indication information; wherein the reference list indication information is used for indicating preferentially used motion information of a first reference list or preferentially used motion information of a second reference list;

wherein the sequentially acquiring the first motion information in the merge candidate list according to a construction order of adjacent blocks in the merge candidate list and reference list indication information comprises:

determining target positions of the adjacent blocks of the merge candidate list according to the construction order of the adjacent blocks in the merge candidate list and the reference list indication information;

for each of the adjacent blocks, if first motion information in a target position is available, acquiring the first motion information stored in the target position; and if the first motion information in the target position is not available, acquiring first motion information stored in an opposite position of the target position; wherein the target position and the opposite position are positions where motion information in different directions is stored;

wherein the updating the GPM motion information candidate list by using the first motion information based on the duplicate checking detection result comprises:

adding the first motion information to the GPM motion information candidate list when the duplicate checking detection result indicates that the first motion information does not coincide with the second motion information in the GPM motion information candidate list;

acquiring first motion information stored in an opposite position of a position where the first motion information is located, and updating the GPM motion information candidate list by using the first motion information stored in the opposite position when the duplicate checking detection result indicates that the first motion information coincides with the second motion information; and acquiring next first motion information in the merge candidate list according to the preset acquisition strategy, and continuing to perform duplicate information removal processing on the next first motion information to update the GPM motion information candidate list.

7. The method according to claim 6, wherein the updating the GPM motion information candidate list by using the first motion information stored in the opposite position comprises:

performing duplicate information removal processing on the first motion information stored in the opposite position to update the GPM motion information candidate list;

or adding the first motion information stored in the opposite position to the GPM motion information candidate list.

8. The method according to claim 6, wherein at least part of the first motion information in the merge candidate list is stored in the GPM motion information candidate list, or mapping information of at least part of the first motion information in the merge candidate list is stored in the GPM motion information candidate list.

9. The method according to claim 8, wherein when mapping information of at least part of the first motion information in the merge candidate list is stored in the GPM motion information candidate list, the adding the first motion information to the GPM motion information candidate list comprises:

adding mapping information of the first motion information to the GPM motion information candidate list, wherein the mapping information of the first motion information comprises: an index of the first motion information in the merge candidate list and reference list indication information.

10. The method according to claim 6, wherein the constructing a GPM motion information candidate list according to first motion information in the merge candidate list of the current block comprises:
  constructing a first motion information candidate list corresponding to a first partition of the current block and a second motion information candidate list corresponding to a second partition of the current block respectively according to the first motion information in the merge candidate list of the current block, wherein a process of the constructing comprises performing duplicate information removal processing on the first motion information.

11. The method according to claim 6, wherein the determining an inter prediction value of the current block according to the GPM motion information candidate list comprises:
  parsing a bitstream to determine first index information corresponding to motion information of a first partition of the current block and second index information corresponding to motion information of a second partition of the current block in the GPM motion information candidate list;
  acquiring the motion information of the first partition from the GPM motion information candidate list based on the first index information;
  acquiring the motion information of the second partition from the GPM motion information candidate list based on the second index information;
  calculating a first prediction value of the first partition by using the motion information of the first partition, and calculating a second prediction value of the second partition by using the motion information of the second partition; and
  weighting and merging the first prediction value and the second prediction value to obtain the inter prediction value of the current block.

12. A decoder, comprising a processor, wherein the processor is configured to perform the following acts:
  parsing a bitstream to determine a prediction mode parameter of a current block;
  constructing a merge candidate list of the current block when the prediction mode parameter indicates that the current block determines an inter prediction value by using a geometrical partition mode (GPM);
  constructing a GPM motion information candidate list according to first motion information in the merge candidate list of the current block, wherein a process of the constructing comprises performing duplicate information removal processing on the first motion information; and
  determining an inter prediction value of the current block according to the GPM motion information candidate list;
  wherein the constructing a GPM motion information candidate list according to first motion information in the merge candidate list of the current block comprises:
  initializing the GPM motion information candidate list of the current block;
  sequentially acquiring the first motion information in the merge candidate list according to a preset acquisition strategy;
  detecting whether the first motion information coincides with second motion information in the GPM motion information candidate list to obtain a duplicate checking detection result; and
  updating the GPM motion information candidate list by using the first motion information based on the duplicate checking detection result to obtain a constructed GPM motion information candidate list;
  wherein the sequentially acquiring the first motion information in the merge candidate list according to a preset acquisition strategy comprises:
  sequentially acquiring the first motion information in the merge candidate list according to a construction order of adjacent blocks in the merge candidate list and reference list indication information; wherein the reference list indication information is used for indicating preferentially used motion information of a first reference list or preferentially used motion information of a second reference list;
  wherein the sequentially acquiring the first motion information in the merge candidate list according to a construction order of adjacent blocks in the merge candidate list and reference list indication information comprises:
  determining target positions of the adjacent blocks of the merge candidate list according to the construction order of the adjacent blocks in the merge candidate list and the reference list indication information;
  for each of the adjacent blocks, if first motion information in a target position is available, acquiring the first motion information stored in the target position; and if the first motion information in the target position is not available, acquiring first motion information stored in an opposite position of the target position; wherein the target position and the opposite position are positions where motion information in different directions is stored;
  wherein the updating the GPM motion information candidate list by using the first motion information based on the duplicate checking detection result comprises:
  adding the first motion information to the GPM motion information candidate list when the duplicate checking detection result indicates that the first motion information does not coincide with the second motion information in the GPM motion information candidate list;
  acquiring first motion information stored in an opposite position of a position where the first motion information is located, and updating the GPM motion information candidate list by using the first motion information stored in the opposite position when the duplicate checking detection result indicates that the first motion information coincides with the second motion information; and
  acquiring next first motion information in the merge candidate list according to the preset acquisition strategy, and continuing to perform duplicate information removal processing on the next first motion information to update the GPM motion information candidate list.

* * * * *